US012191934B2

United States Patent
Kim et al.

(10) Patent No.: US 12,191,934 B2
(45) Date of Patent: Jan. 7, 2025

(54) ELECTRONIC DEVICE INCLUDING FLEXIBLE DISPLAY AND METHOD OF OPERATING THE SAME

(71) Applicant: Samsung Electronics Co., Ltd., Suwon-si (KR)

(72) Inventors: Raetae Kim, Suwon-si (KR); Myunghoon Kwak, Suwon-si (KR); Yongyoun Kim, Suwon-si (KR); Gisoo Lim, Suwon-si (KR); Byounguk Yoon, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 256 days.

(21) Appl. No.: 17/561,011

(22) Filed: Dec. 23, 2021

(65) Prior Publication Data

US 2022/0116077 A1    Apr. 14, 2022

Related U.S. Application Data

(63) Continuation of application No. PCT/KR2021/001735, filed on Feb. 9, 2021.

(30) Foreign Application Priority Data

Jun. 30, 2020    (KR) ........................ 10-2020-0079892

(51) Int. Cl.
*H04B 5/79* (2024.01)
*G06F 3/0482* (2013.01)
(Continued)

(52) U.S. Cl.
CPC ............. *H04B 5/79* (2024.01); *G06F 3/0482* (2013.01); *G06Q 20/3278* (2013.01); *H04M 1/0268* (2013.01)

(58) Field of Classification Search
CPC ............... G06F 3/04883; G06F 3/0488; G06F 3/04886; G06F 1/1626; G06F 3/0412;
(Continued)

(56) References Cited

U.S. PATENT DOCUMENTS

2003/0109286 A1    6/2003   Hack et al.
2019/0028579 A1*   1/2019   Cho .................... G06F 3/04886
(Continued)

FOREIGN PATENT DOCUMENTS

CN       108320669 A     7/2018
JP       2010-252356 A   11/2010
(Continued)

OTHER PUBLICATIONS

Korean Examination Report dated Oct. 8, 2024, issued in Korean Application No. 10-2020-0079892.

*Primary Examiner* — Golam Sorowar
(74) *Attorney, Agent, or Firm* — Jefferson IP Law, LLP

(57) ABSTRACT

An electronic device comprising a flexible display and a method of the electronic device are provided. The method includes displaying, based on a sliding of the flexible display, an object related to a wireless charging function or a payment function, in a first region of the flexible display corresponding to a position of a first antenna included in the electronic device, and when the position of the first antenna is changed by the sliding of the flexible display, changing a display position of the object, based on the changed position of the first antenna.

13 Claims, 23 Drawing Sheets

(51) Int. Cl.
*G06Q 20/32* (2012.01)
*H04M 1/02* (2006.01)

(58) Field of Classification Search
CPC .. G06F 3/04817; G06F 1/1652; G06F 3/0482; G06F 2203/04803; G06F 2203/04101; G06F 2203/04102; G06F 3/04845; G06F 1/1643; G06F 2203/04105; G06F 1/1656; G06F 3/04842; G06F 3/016; G06F 3/017; G06F 1/1616; G06F 1/1637; G06F 3/0416; G06F 1/169; H04M 1/0266; H04M 2250/22; H04M 1/0268; H04M 1/026; H04M 1/72412; H04M 2250/16; H04M 1/0277; H04M 1/72454; H04M 1/02; H04M 2250/12; H04M 1/725; H04M 1/0202; H04M 1/72403; H04M 1/72469; H04M 1/0216; H04M 2250/52; H04M 1/0262; H04M 2250/04; H04M 1/185; H04M 1/22; H04M 1/0274; H04M 1/236; H04M 1/0237; H04M 1/243; H01Q 21/065; H01Q 1/38; H01Q 21/28; H01Q 1/2283; H01Q 1/48; H01Q 1/521; H01Q 9/42; H01Q 9/0435; H01Q 1/2291; H01Q 1/40; H01Q 15/006; H01Q 21/062; H01Q 9/0414; H01Q 9/045; H01Q 9/0457; H01Q 21/08; H01Q 1/44; H01Q 13/10; H01Q 21/0006

See application file for complete search history.

(56) References Cited

U.S. PATENT DOCUMENTS

| | | | |
|---|---|---|---|
| 2019/0043038 A1* | 2/2019 | Jang | G06V 20/20 |
| 2019/0103656 A1* | 4/2019 | Shi | G06F 1/1647 |
| 2019/0261519 A1* | 8/2019 | Park | G06F 3/04886 |
| 2019/0312451 A1 | 10/2019 | An et al. | |
| 2020/0004297 A1* | 1/2020 | Rekapalli | G06F 1/1618 |
| 2021/0135492 A1 | 5/2021 | Kim et al. | |
| 2021/0159585 A1* | 5/2021 | Choi | G06F 1/1652 |
| 2022/0287193 A1* | 9/2022 | Chun | G09F 9/30 |

FOREIGN PATENT DOCUMENTS

| | | |
|---|---|---|
| KR | 10-2016-0141255 A | 12/2016 |
| KR | 10-2017-0082926 A | 7/2017 |
| KR | 10-2017-0087732 A | 7/2017 |
| KR | 10-2019-0101184 A | 8/2019 |
| KR | 10-2019-0115888 A | 10/2019 |
| KR | 10-2019-0118058 A | 10/2019 |
| KR | 10-2020-0002686 A | 1/2020 |
| KR | 10-2020-0041970 A | 4/2020 |

* cited by examiner

ELECTRONIC DEVICE INCLUDING FLEXIBLE DISPLAY AND METHOD OF OPERATING THE SAME

CROSS-REFERENCE TO RELATED APPLICATION(S)

This application is a continuation application, claiming priority under § 365(c), of an International application No. PCT/KR2021/001735, filed on Feb. 9, 2021, which is based on and claims the benefit of a Korean patent application number 10-2020-0079892, filed on Jun. 30, 2020, in the Korean Intellectual Property Office, the disclosure of which is incorporated by reference herein in its entirety.

TECHNICAL FIELD

The disclosure relates to an electronic device. More particularly, the disclosure relates to an electronic device including a flexible display and a method for operating the same.

BACKGROUND ART

In line with increasing demands for mobile communication and, on the other hand, increasing degrees of integration of electronic devices, the portability of electronic devices (for example, mobile communication terminals) may be improved, and convenience thereof in connection with use of multimedia functions and the like may be improved. For example, displays having integrated touchscreen functions may replace traditional mechanical (button-type) keypads such that electronic devices can become compact while maintaining input device functions. For example, removal of mechanical keypads from electronic devices may improve the portability of the electronic devices. In another embodiment, if displays are expanded as much as the areas from which mechanical keypads are removed, electronic devices incorporating touchscreen functions may provide larger screens than electronic devices including mechanical keypads, even if having the same size and weight with the electronic devices including mechanical keypads.

In connection with using web surfing or multimedia functions, it may be more convenient to use electronic devices having larger screens. Electronic devices may be equipped with larger displays to output larger screens, but, in view of the portability of electronic devices, there may be restrictions on expanding the display size. In an embodiment, a display using an organic light-emitting diode may secure the portability of an electronic device while providing a larger screen. For example, a display using an organic light-emitting diode (or an electronic device equipped therewith) may implement stable operations even if having a considerably small thickness, and thus may be mounted on an electronic device in a foldable, bendable, or rollable type.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

Aspects of the disclosure are to address at least the above-mentioned problems and/or disadvantages and to provide at least the advantages described below. Accordingly, an aspect of the disclosure is to provide an electronic device capable of securing a stable wireless communication environment in connection with a structure configured such that the screen output region of the display thereof can be expanded by a sliding movement.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a first structure including a first plate which provides a first surface and a second surface facing a direction opposite to that of the first surface, a second structure coupled so as to surround at least a portion of the first structure and configured to guide sliding of the first structure in a direction parallel to the first surface or the second surface of the first structure, a flexible display including a first region mounted on the first surface of the first structure and a second region extending from the first region, the second region being at least partially received in the second structure at one side of the second structure or visually exposed out of the second structure by the sliding of the first structure, and at least one antenna structure disposed in at least one of the first structure or the second structure, wherein the antenna structure is at least partially positioned between the first region and the second region while the second region is received in the second structure.

In accordance with another aspect of the disclosure, a method for operating an electronic device including a flexible display is provided. The method includes displaying, based on sliding of the flexible display, an object related to the wireless charging function or payment function in a first region of the flexible display corresponding to a position of a first antenna included in the electronic device, and when the position of the first antenna is changed by the sliding of the flexible display, changing a display position of the object, based on the changed position of the first antenna.

Advantageous Effects

When a screen output region of a display of an electronic device according to various embodiments disclosed herein is expanded, an antenna device may easily transmit/receive radio waves to outer spaces. In an embodiment, a sliding operation and a user interface may interwork with each other, thereby providing various user experiences.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

Figure 1:
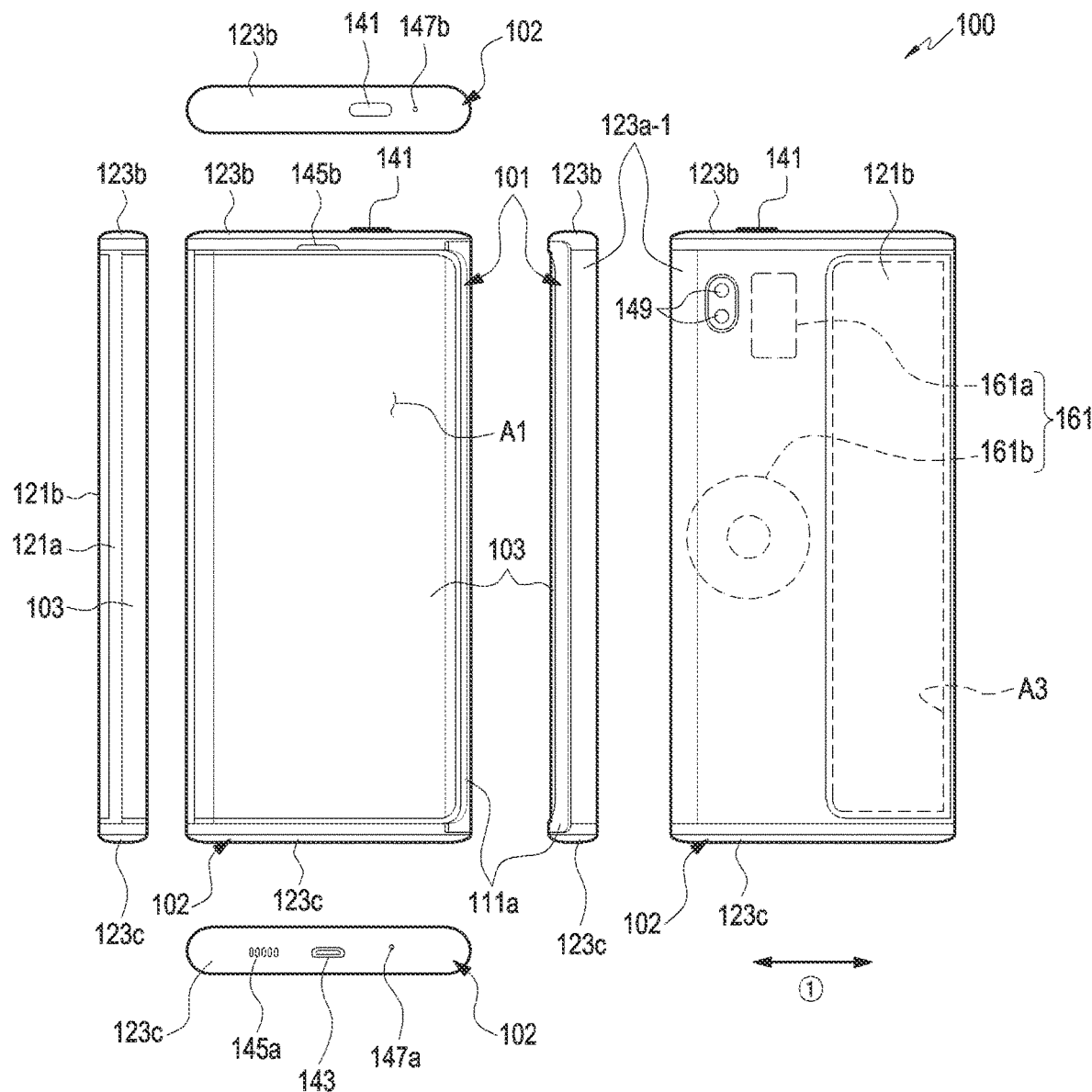
FIG. 1 illustrates an electronic device according to various embodiments disclosed herein, and illustrates a state in which one portion of a flexible display is received in a second structure according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 illustrates an electronic device according to various embodiments disclosed herein, and illustrates a state in which one portion (e.g., a second region A2) of a flexible display is received in a second structure according to an embodiment of the disclosure.

Figure 2:
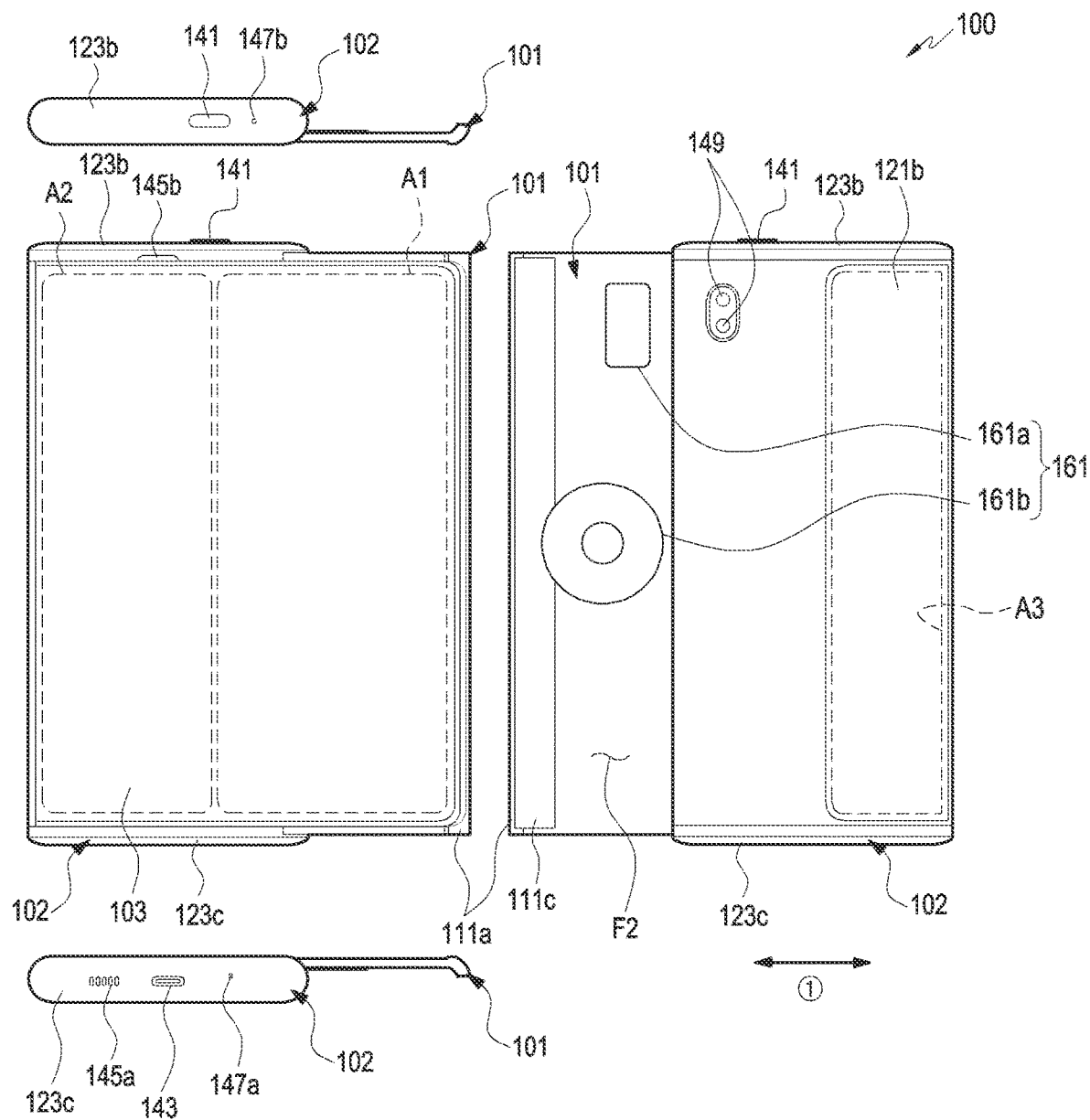
FIG. 2 illustrates an electronic device according to various embodiments disclosed herein, and illustrates a state in which most of a flexible display is visually exposed to the outside of a second structure according to an embodiment of the disclosure.

FIG. 2 illustrates the electronic device according to various embodiments disclosed herein, and illustrates a state in which most of the flexible display is visually exposed to the outside of the second structure according to an embodiment of the disclosure.

Referring to FIGS. 1 and 2, the state illustrated in FIG. 1 may be defined as a state in which a first structure 101 is closed with respect to the second structure 102, and the state illustrated in FIG. 2 may be defined as a state in which the first structure 101 is opened with respect to the second structure 102. According to an embodiment, "closed state" or "opened state" may be defined as a state in which an electronic device is closed or opened. The electronic device 100 may include the first structure 101 and the second structure 102 disposed to be movable in the first structure 101. In an embodiment, it may be understood that the electronic device 100 has a structure in which the first structure 101 is disposed to be slidable on the second structure 102. According to an embodiment, the first structure 101 may be disposed so as to reciprocate in an illustrated direction, for example, in a direction indicated by arrow ①, with reference to the second structure 102 between a closed state and an opened state.

According to various embodiments, the first structure 101 may include a first plate 111a (e.g., a slide plate), and may include a first surface F1 (see FIG. 3) formed to include at least one portion of the first plate 111a and a second surface F2 facing in a direction opposite to that of the first surface F1. According to an embodiment, the second structure 102 may include a second plate 121a (see FIG. 3) (e.g., a rear case), a first side wall 123a extending from the second plate 121a, a second side wall 123b extending from the first side wall 123a and the second plate 121a, a third side wall 123c extending from the first side wall 123a and the second plate 121a and parallel to the second side wall 123b, and/or a rear plate 121b (e.g., a rear window). In an embodiment, the second side wall 123b and the third side wall 123c may be formed perpendicular to the first side wall 123a. According to an embodiment, one side (e.g., a front surface) of each of the second plate 121a, the first side wall 123a, the second side wall 123b, and the third side wall 123c may be formed to be open such that the same receive (or surround) at least a portion of the first structure 101. For example, the first structure 101 may be coupled to the second structure 102 while being at least partially surrounded by the second structure 102, and may slide in a direction parallel to the first surface F1 or the second surface F2, for example, in a direction of arrow ① while being guided by the second structure 102.

According to various embodiments, the second side wall 123b or the third side wall 123c may be omitted. According to an embodiment, the second plate 121a, the first side wall 123a, the second side wall 123b, and/or the third side wall 123c may be formed as separate structures, and may be coupled or assembled. The rear plate 121b may be coupled to the second plate 121a so as to surround at least a portion of the second plate 121a. In an embodiment, the rear plate 121b may be substantially formed integrally with the second plate 121a. According to an embodiment, the second plate 121a or the rear plate 121b may cover at least a portion of the flexible display 103. For example, the flexible display 103 may be at least partially received in the second structure 102, and the second plate 121a or the rear plate 121b may cover a portion (e.g., the second region A2) of the flexible display 103 received in the second structure 102.

According to various embodiments, the first structure 101 can move in an opened state or a closed state with respect to the second structure 102 in a first direction (e.g., direction ①) parallel to the second plate 121a (e.g., the rear case) and the second side wall 123b, and may move such that the first structure 101 is placed at a first distance from the first side wall 123a (e.g., a first side wall part 123a-1) in the closed state and is placed at a second distance greater than the first distance from the first side wall 123a (e.g., the first side wall part 123a-1) in the opened state. In an embodiment, in the closed state, the first structure 101 may be placed so as to surround one portion of the first side wall 123*a* (e.g., the first side wall part 123*a*-1).

According to various embodiments, the electronic device 100 may include a flexible display 103, a key input device 141, a connector hole 143, audio modules 145*a*, 145*b*, 147*a*, and 147*b*, or a camera module 149. Although not illustrated, the electronic device 100 may further include an indicator (e.g., a light emitting diodes (LED) device) or various types of sensor modules.

According to various embodiments, the flexible display 103 may include a first region A1 and a second region A2. In an embodiment, the first region A1 may be disposed on the first surface F1 while substantially extending across at least a portion of the first surface F1. The second region A2 may extend from the first region A1, and, by sliding of the first structure 101, may be inserted into or received in the second structure 102 (e.g., a housing) or may be visually exposed out of the second structure 102. As described later, the second region A2 may be substantially moved while being guided by a roller 151 (see FIG. 3) mounted to the second structure 102, and may be received in or visually exposed out of the second structure 102. For example, one portion of the second region A2 may be deformed into a curved shape at a position corresponding to the roller 151 while the first structure 101 slides.

According to various embodiments, when seen from above the first plate 111*a* (e.g., the slide plate), if the first structure 101 moves from the closed state to the opened state, the second region A2 may substantially form a flat surface together with the first region A1 while being gradually visually exposed out of the second structure 102. The flexible display 103 may be coupled to or disposed adjacent to a touch sensing circuit, a pressure sensor capable of measuring the strength (pressure) of a touch, and/or a digitizer for detecting a magnetic field-type stylus pen. In an embodiment, the second region A2 may be at least partially received in the second structure 102, and even in the state illustrated FIG. 1 (e.g., the closed state), a portion of the second region A2 may be visually exposed to the outside. In an embodiment, regardless of the closed state or the opened state, the visually exposed portion of the second region A2 may be placed on the roller 151, and the portion of the second region A2 may maintain a curved shape in a position corresponding to the roller 151.

The key input device 141 may be disposed on the second side wall 123*b* or the third side wall 123*c* of the second structure 102. In consideration of the exterior and the state of use, the electronic device 100 may be manufactured such that the illustrated key input device 141 may be omitted or an additional key input device(s) is (are) included. In an embodiment, the electronic device 100 may include a key input device, which has not been illustrated, for example, a home key button or a touch pad disposed around the home key button. According to another embodiment, at least a portion of the key input device 141 may be positioned in one region of the first structure 101.

According to various embodiments, the connector hole 143 may be omitted according to an embodiment, and may receive a connector (e.g., a USB connector) for transmitting or receiving power and/or data to or from an external electronic device. Although not illustrated, the electronic device 100 may include multiple connector holes 143, and some of the multiple connector holes 143 may function as connector holes for transmitting or receiving an audio signal to or from the external electronic device. In the illustrated embodiment, the connector hole 143 is disposed on the third side wall 123*c*, but it is noted that the disclosure is not limited thereto. The connector hole 143 or an unillustrated additional connector hole may be disposed in the first side wall 123*a* or the second side wall 123*b*.

According to various embodiments, the audio modules 145*a*, 145*b*, 147*a*, and 147*b* may include speaker holes 145*a* and 145*b* or microphone holes 147*a* and 147*b*. One of the speaker holes 145*a* and 145*b* may be provided as a receiver hole for a voice call, and the other speaker hole may be provided as an external speaker hole. A microphone for acquiring outside sounds may be disposed in each of the microphone holes 147*a* and 147*b*, and in an embodiment, multiple microphones may be disposed therein so as to sense the direction of a sound. In an embodiment, the speaker holes 145*a* and 145*b* and the microphone holes 147*a* and 147*b* may be implemented as a single hole, or a speaker (e.g., a piezo speaker) may be included without the speaker holes 145*a* and 145*b*. According to an embodiment, the speaker hole denoted by reference numeral "145*b*" may be disposed in the first structure 101 and used as a receiver hole for a voice call, and the speaker hole (e.g., an external speaker hole) denoted by reference numeral "145*a*" or the microphone holes 147*a* and 147*b* may be disposed in the second structure 102 (e.g., one of side walls 123*a*, 123*b*, and 123*c*).

The camera module 149 may be provided in the second structure 102, and may capture an image of a subject in a direction opposite to that of the first region A1 of the flexible display 103. The electronic device 100 may include multiple camera modules 149. For example, the electronic device 100 may include a wide-angle camera, a telephoto camera, or a close-up camera, and according to an embodiment, may include an infrared projector and/or an infrared receiver so as to measure the distance to a subject. The camera module 149 may include one or multiple lenses, an image sensor, and/or an image signal processor. Although not illustrated, the electronic device 100 may further include a camera module (e.g., a front-facing camera) for capturing an image of a subject in a direction identical to that of the first region A1 of the flexible display 103. For example, the front-facing camera may be disposed around the first region A1 or in a region in which the front-facing camera overlaps the flexible display 103, and when the front-facing camera is disposed in the region in which the same overlaps the flexible display 103, the front-facing camera may capture an image of a subject through the flexible display 103.

According to various embodiments, the indicator (not shown) of the electronic device 100 may be disposed in the first structure 101 or the second structure 102, and may include a light-emitting diode so as to provide state information of the electronic device 100 in the form of a visual signal. The sensor module (not shown) of the electronic device 100 may generate an electrical signal or a data value corresponding to the operational state of the inside of the electronic device 100 or an external environment state. The sensor module may include, for example, a proximity sensor, a fingerprint sensor, or a biometric sensor (e.g., an iris/face recognition sensor or an HRM sensor). In another embodiment, the sensor module may further include at least one of, for example, a gesture sensor, a gyro sensor, a barometric pressure sensor, a magnetic sensor, an acceleration sensor, a grip sensor, a color sensor, an infrared (IR) sensor, a temperature sensor, a humidity sensor, or an illuminance sensor.

Figure 3:
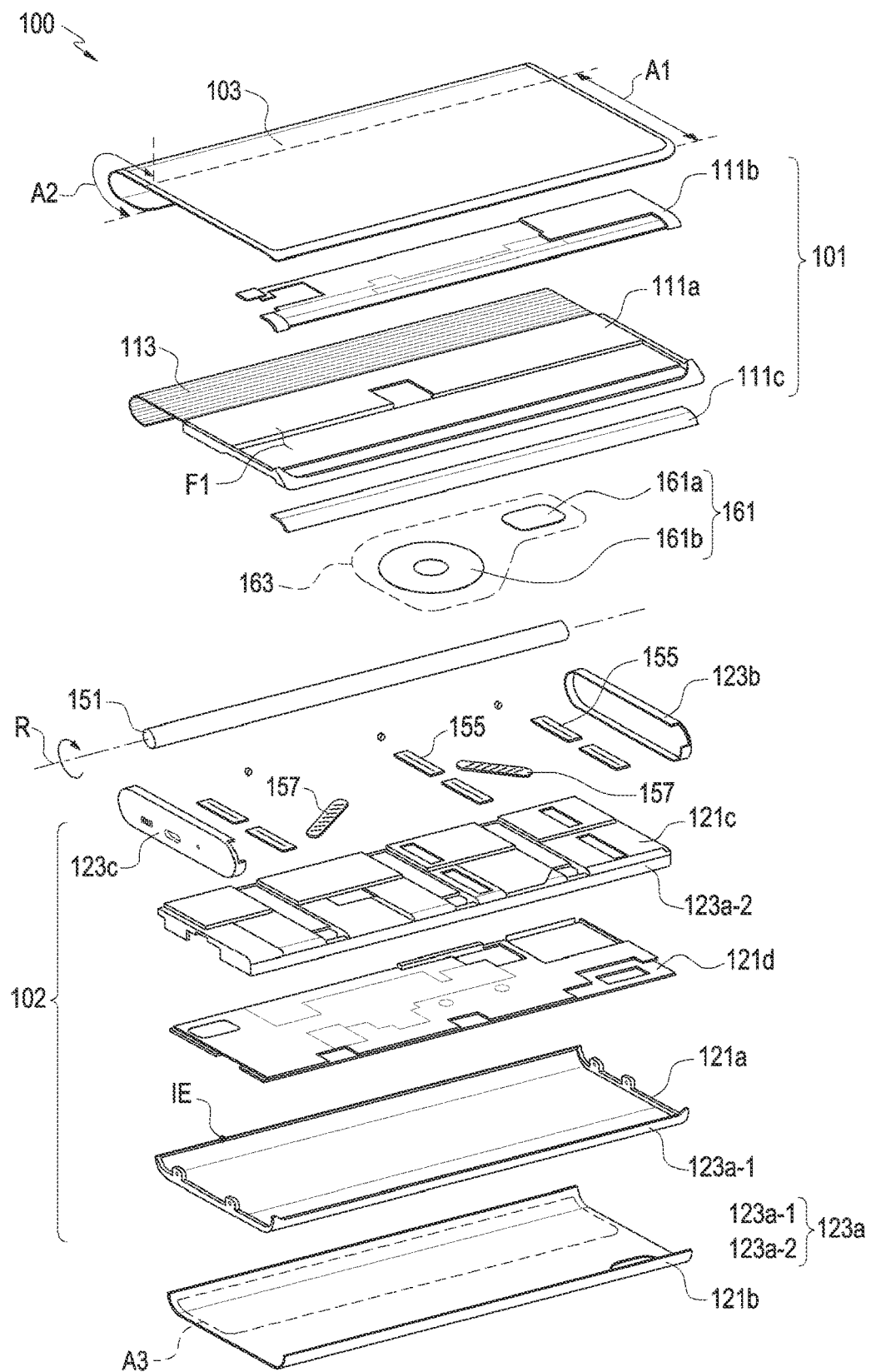
FIG. 3 is an exploded perspective view illustrating an electronic device according to an embodiment of the disclosure.

FIG. 3 is an exploded perspective view illustrating an electronic device (e.g., the electronic device 100 in FIG. 1 or 2) according to an embodiment of the disclosure.

Figure 4A:
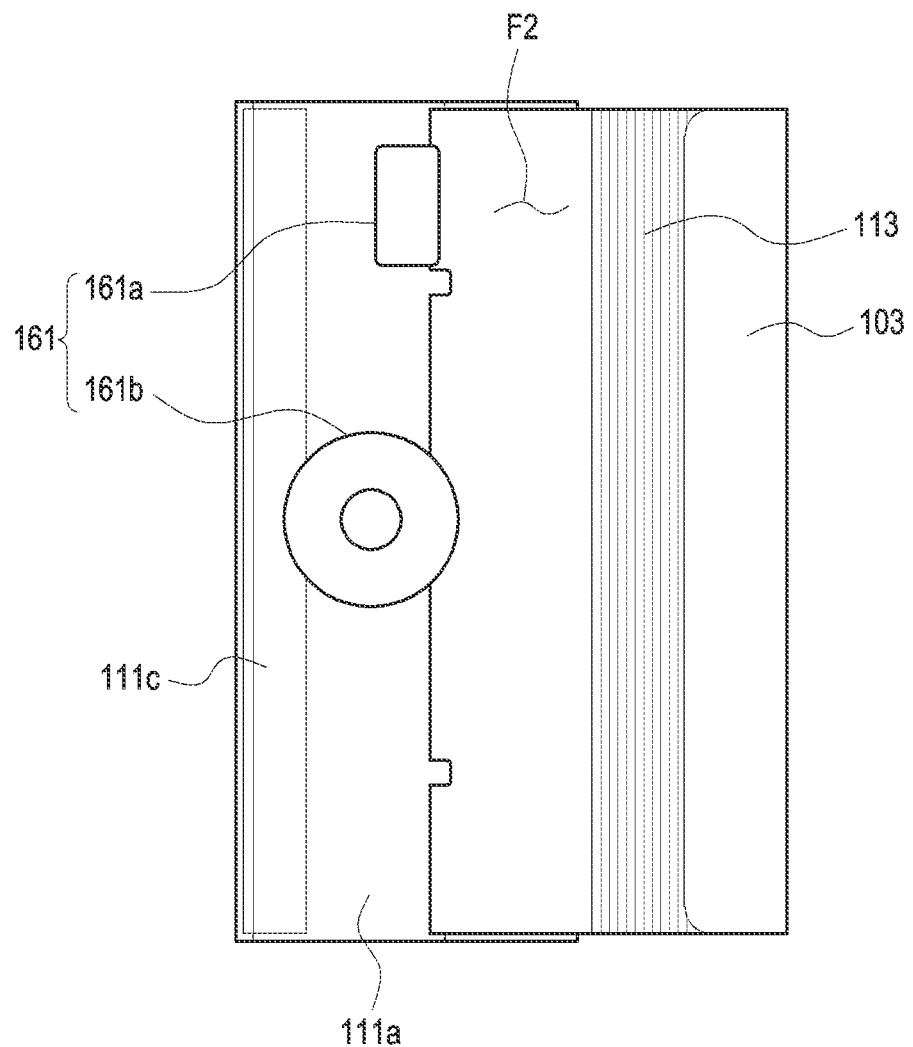
FIG. 4A is a bottom view illustrating a shape in which a flexible display of an electronic device according to various embodiments disclosed herein is mounted according to an embodiment of the disclosure.

FIG. 4A is a bottom view illustrating a shape in which a flexible display of an electronic device (e.g., the electronic device 100 in FIGS. 1 to 3) according to various embodiments disclosed herein is mounted according to an embodiment of the disclosure.

Figure 4B:
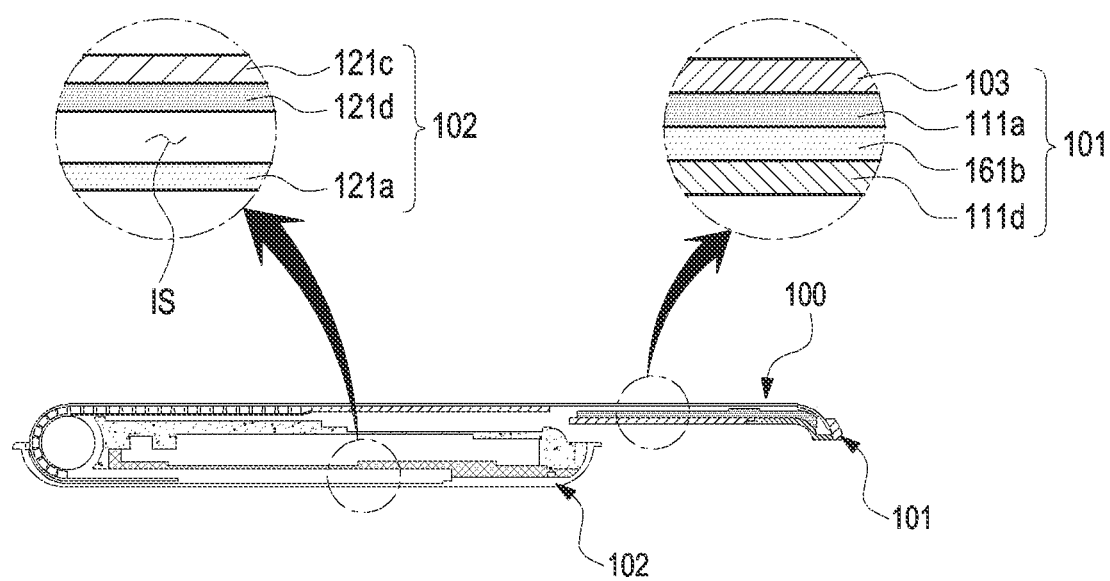
FIG. 4B is a view illustrating an embodiment regarding a placement of an antenna structure in an electronic device according to various embodiments of the disclosure.

FIG. 4B is a view illustrating an embodiment regarding the placement of an antenna structure in an electronic device (e.g., the electronic device 100 in FIGS. 1 to 3) according to an embodiment of the disclosure.

FIG. 4B illustrates a configuration in which, for example, an antenna structure (e.g., a second antenna 161b) is disposed in the first structure.

Referring to FIGS. 3, 4A, and 4B, the electronic device 100 may include the first structure 101, the second structure 102 (e.g., the housing), a flexible display 103 (e.g., the flexible display), a guide member (e.g., the roller 151), a multi joint hinge structure 113, and/or at least one antenna structure 161. One portion (e.g., the second region A2) of the flexible display 103 may be received into the second structure 102 (e.g., a gap or space indicated by "IS") while being guided by the roller 151.

According to various embodiments, the first structure 101 may include the first plate 111a (e.g., the slide plate), and a first bracket 111b and/or a second bracket 111c, mounted on the first plate 111a. The first structure 101, for example, the first plate 111a, the first bracket 111b, and/or the second bracket 111c, may be formed of a metal material and/or a nonmetal (e.g., polymer) material. The first plate 111a may be mounted in the second structure 102 (e.g., the housing), and may be linearly reciprocated in one direction (e.g., a direction of arrow ① in FIG. 1) while being guided by the second structure 102. In an embodiment, the first bracket 111b may be coupled to the first plate 111a to form a first surface F1 of the first structure 101 together with the first plate 111a. The first region A1 of the flexible display 103 may be substantially mounted on the first surface F1 and maintained in a flat plate shape. The second bracket 111c may be coupled to the first plate 111a to form a second surface F2 of the first structure 101 together with the first plate 111a. According to an embodiment, the first bracket 111b and/or the second bracket 111c may be formed integrally with the first plate 111a. This may be appropriately designed in consideration of an assembling structure or a manufacturing process of a product to be manufactured. The first structure 101 or the first plate 111a may be coupled to the second structure 102, and may slide with respect to the second structure 102.

According to various embodiments, the multi joint hinge structure 113 may include multiple rods extending in a straight line and disposed parallel to a rotation axis R of the roller 151, and the multiple rods may be arranged in a direction perpendicular to the rotation axis R, for example, in a direction in which the first structure 101 slides. In an embodiment, the multi joint hinge structure 113 is connected to one end of the first structure 101, and thus may move with respect to the second structure 102 by sliding of the first structure 101. For example, in a closed state (e.g., the state illustrated in FIG. 1), the multi joint hinge structure 113 may be substantially received in the second structure 102, and, in an opened state (e.g., the state illustrated in FIG. 2), the multi joint hinge structure 113 may be extracted out of the second structure 102. In an embodiment, even in the closed state, a portion of the multi joint hinge structure 113 may not be received in the second structure 102. For example, even in the closed state, a portion of the multi joint hinge structure 113 may be positioned to correspond to the roller 151 outside the second structure 102.

According to various embodiments, each of the rods of the multi joint hinge structure 113 may rotate around another neighboring rod while remaining parallel with the other neighboring bar. Thus, as the first structure 101 slides, the multi joint hinge structure 113 may form a curved surface at a portion facing the roller 151, and may form a flat surface at a portion which does not face the roller 151. In an embodiment, the second region A2 of the flexible display 103 may be mounted on or supported by the multi joint hinge structure 113, and, in an opened state (e.g., the state illustrated in FIG. 2), may be visually exposed out of the second structure 102 together with the first region A1. In a state in which the second region A2 is visually exposed out of the second structure 102, the multi joint hinge structure 113 may substantially form a flat surface, thereby supporting or maintaining the second region A2 in a flat state.

According to various embodiments, the second structure 102 (e.g., the housing) may include a second plate 121a (e.g., a rear case), a rear plate 121b, a third plate 121c (e.g., a front case), and a printed circuit board 121d. In an embodiment, the electronic device 100 may further include a support member which is not illustrated. The support member may be divided into, for example, a gap or a space (e.g., the gap or space indicated by "IS" in FIG. 4B or 5B) in which one portion of the flexible display 103 is received and a space in which the printed circuit substrate 121d is disposed). The second plate 121a, for example, the rear case, may be disposed to face a direction opposite to that of the first surface F1 of the first plate 111a, and may substantially provide the exterior shape of the second structure 102 or the electronic device 100. In an embodiment, the second structure 102 may include a first side wall 123a extending from the second plate 121a, a second side wall 123b extending from the second plate 121a and formed substantially perpendicular to the first side wall 123a, and a third side wall 123c which extends from the second plate 121a, is substantially perpendicular to the first side wall 123a, and is parallel to the second side wall 123b. In the illustrated embodiment, a structure in which the second side wall 123b and the third side wall 123c are manufactured as components separate from the second plate 121a and are mounted or assembled to the second plate 121a is illustrated. However, the second side wall 123b and the third side wall 123c may be formed integrally with the second plate 121a.

According to various embodiments, the rear plate 121b may be coupled to the outer surface of the second plate 121a, and may be manufactured integrally with the second plate 121a according to an embodiment. In an embodiment, the second plate 121a may be manufactured using a metal or a polymer material, and the rear plate 121b may be manufactured using a material, such as metal, glass, synthetic resin, or ceramic, thereby providing a decoration effect to the exterior of the electronic device 100. According to an embodiment, the second plate 121a and/or the rear plate 121b may be at least partially (e.g., at an auxiliary display region A3) manufactured using a light-transmitting material. In an embodiment, in a state in which a portion (e.g., the second region A2) of the flexible display 103 is received in the second structure 102, at least a portion of the second region A2 may be positioned so as to correspond to the auxiliary display region A3. For example, while being received in the second structure 102, the flexible display 103 may output a screen by using the at least portion of the second region A2, and a user may recognize the screen output through the auxiliary display region A3.

According to various embodiments, the third plate 121c may be manufactured using a metal or a polymer material, and may be coupled to the second plate 121a (e.g., the rear case), the first side wall 123a, the second side wall 123b, and/or the third side wall 123c, thereby forming an inner space of the second structure 102. According to an embodiment, the third plate 121c may be called a "front case", and the first structure 101, for example, the first plate 111a, may slide while substantially facing the third plate 121c. In an embodiment, the first side wall 123a may be formed by a combination of a first side wall part 123a-1 extending from the second plate 121a and a second side wall part 123a-2 formed at one-side edge of the third plate 121c. In another embodiment, the first side wall part 123a-1 may be coupled so as to surround the one-side edge of the third plate 121c, for example, the second side wall part 123a-2, in which case the first side wall part 123a-1 itself may form the first side wall 123a.

According to various embodiments, the support member, which is not illustrated, may be disposed in a space between the second plate 121a and the third plate 121c, and may have the shape of a flat plate manufactured using a metal or a polymer material. The support member may provide an electromagnetic shielding structure in the inner space of the second structure 102, or may increase the mechanical rigidity of the second structure 102. In an embodiment, when received in the second structure 102, the multi joint hinge structure 113 and/or a partial region (e.g., the second region A2) of the flexible display 103 may be positioned in a space between the second plate 121a and the support member.

According to various embodiments, the printed circuit board 121d may be disposed in a space between the third plate 121c and the support member. For example, the printed circuit board 121d may be received in a space that is separated from the space (IS), which receives the multi joint hinge structure 113 and/or a partial region of the flexible display 103, by the unillustrated support member in the second structure 102. A processor, a memory, and/or an interface may be mounted on the printed circuit board 121d. The processor may include at least one among, for example, a central processing unit, an application processor, a graphics processing device, an image signal processor, a sensor hub processor, or a communication processor.

The memory may include, for example, a volatile memory or a nonvolatile memory.

The interface may include, for example, a high definition multimedia interface (HDMI), a universal serial bus (USB) interface, an SD card interface, and/or an audio interface. The interface, for example, may electrically or physically connect the electronic device 100 to an external electronic device, and may include a USB connector, an SD card/MMC connector, or an audio connector.

According to various embodiments, the flexible display 103 is a flexible display based on an organic light-emitting diode, and may be at least partially deformed into a curved shape while maintaining a flat shape as a whole. In an embodiment, the first region A1 of the flexible display 103 may be mounted or attached to the first surface F1 of the first structure 101, thereby maintaining a substantially flat shape. The second region A2 extends from the first region A1, and may be supported by or attached to the multi joint hinge structure 113. For example, the second region A2 extends in a direction in which the first structure 101 slides, may be received in the second structure 102 together with the multi joint hinge structure 113, and may be deformed so as to at least partially form a curved shape depending on the deformation of the multi joint hinge structure 113.

According to various embodiments, the area of the flexible display 103 visually exposed to the outside may vary depending on sliding of the first structure 101 on the second structure 102. The electronic device 100 (e.g., the processor) may change an activation region of the flexible display 103 on the basis of the area of the flexible display 103 visually exposed to the outside. For example, in an opened state or in an intermediate state between the opened state and a closed state, the electronic device 100 may activate a region visually exposed to the outside of the second structure 102, among the entire area of the flexible display 103. In the closed state, the electronic device 100 may activate the first region A1 of the flexible display 103, and may deactivate the second region A2. In the closed state, if there is no user input for a predetermined time (e.g., 30 seconds or 2 minutes), the electronic device 100 may deactivate the entire region of the flexible display 103. In an embodiment, in a state in which the entire region of the flexible display 103 is deactivated, the electronic device 100 may activate a partial region of the flexible display 103 according to necessity (e.g., notification according to user configuration, missed call/message arrival notification) to provide visual information through the auxiliary display region A3.

According to various embodiments, in the opened state (e.g., the state illustrated in FIG. 2), the entire region (e.g., the first region A1 and the second region A2) of the flexible display 103 may be visually exposed to the outside, and the first region A1 and the second region A2 may be arranged to form a flat surface. In an embodiment, even in the opened state, a portion (e.g., one end) of the second region A2 may be positioned to correspond to the roller 151, and the portion of the second region A2, corresponding to the roller 151, may be maintained in a curved shape. For example, in various embodiments disclosed herein, even when it is described that "in the opened state, the second region A2 is disposed to form a flat surface", a portion of the second region A2 may be maintained in a curved shape. Similarly, even when it is described that "in the closed state, the multi joint hinge structure 113 and/or the second region A2 is received in the second structure 102", the multi joint hinge structure 113 and/or a portion of the second region A2 may be positioned outside the second structure 102.

According to various embodiments, the guide member, for example, the roller 151, may be rotatably mounted to the second structure 102 at a position adjacent to a one-side edge of the second structure 102 (e.g., the second plate 121a). For example, the roller 151 may be disposed adjacent to an edge (e.g., a portion denoted by reference numeral "IE") of the second plate 121a that is parallel to the first side wall 123a. Although not given a reference numeral in the drawings, another side wall may extend from an edge of the second plate 121a that is adjacent to the roller 151, and a side wall adjacent to the roller 151 may be substantially parallel to the first side wall 123a. In an embodiment, the side wall of the second structure 102, adjacent to the roller 151, may be manufactured using a light-transmitting material, and a portion of the second region A2 may provide visual information through one portion of the second structure 102 while being received in the second structure 102. The wording "may be disposed adjacent to" may have a meaning of being disposed to be spaced within 5 mm. For example, the roller 151 may be disposed to be spaced no more than 5 mm apart from an edge (e.g., a portion indicated by reference numeral "IE") of the second plate 121a that is parallel to first side wall 123a.

According to various embodiments, one end of the roller 151 may be rotatably coupled to the second side wall 123b, and the other end thereof may be rotatably coupled to the third side wall 123c. For example, the roller 151 may be mounted to the second structure 102, and may rotate about a rotation axis R perpendicular to a sliding direction of the first structure 101 (e.g., the direction of arrow (in FIG. 1 or 2). The rotation axis R may be disposed substantially parallel to the first side wall 123a, and may be positioned away from the first side wall 123a, for example, may be positioned at the one-side edge of the second plate 121a. In an embodiment, the gap formed between the outer circumferential surface of the roller 151 and the inner surface of an edge of the second plate 121a may form an entrance through which the multi joint hinge structure 113 or the flexible display 103 moves into the second structure 102.

According to various embodiments, when the flexible display 103 is deformed into a curved shape, the roller 151 may maintain the curvature radius of the flexible display 103 to a predetermined extent, thereby suppressing excessive deformation of the flexible display 103. The "excessive deformation" may imply that the flexible display 103 is deformed to have an excessively small curvature radius to such an extent that a pixel or a signal wire included in the flexible display 103 is damaged. For example, the flexible display 103 may be moved or deformed while being guided by the roller 151, and may be protected from a damage due to excessive deformation. In an embodiment, the roller 151 may rotate while the multi joint hinge structure 113 or the flexible display 103 is inserted into or drawn out of the second structure 102. For example, the multi joint hinge structure 113 (or the flexible display 103) may be smoothly inserted into/drawn out of the second structure 102 by suppressing or preventing friction between the multi joint hinge structure 113 (or the flexible display 103) and the second structure 102.

According to various embodiments, the electronic device 100 may further include a guide rail 155 (guide rails) and/or an actuating member 157 (actuating members). The guide rail 155 (guide rails) may be mounted on the second structure 102, for example, the third plate 121c so as to guide sliding of the first structure 101 (e.g., the first plate 111a or the slide plate). The actuating member 157 (actuating members) may include a spring or a spring module, which provides elastic force in a direction in which the opposite ends thereof move away from each other. One end of the actuating member 157 (actuating members) may be rotatably supported by the second structure 102, and the other end thereof may be rotatably supported by the first structure 101.

According to various embodiments, when the first structure 101 slides, the opposite ends of the actuating member 157 (actuating members) are positioned closest to each other at one point between the closed state and the opened state (hereinafter, "closest approach point"). For example, in the interval between the closest approach point and the closed state, the actuating member 157 (actuating members) may provide elastic force to the first structure 101 in a direction of movement toward the closed state, and in the interval between the closest approach point and the opened state, the actuating member 157 (actuating members) may provide elastic force to the first structure 101 in a direction of movement toward the opened state.

According to various embodiments, the antenna structure 161 may be disposed in at least one of the first structure 101 or the second structure 102, for example, in the first structure 101. In an embodiment in which the antenna structure 161 is disposed in the first structure 101, the antenna structure 161 may be selectively exposed to an outer space. For example, the antenna structure may be disposed and hidden between the first structure 101 and the second structure 102 in a closed state, and may be exposed to an outer space in an opened state. The antenna structure 161 may include a loop antenna formed by arranging electrically-conductive bodies, for example, electrically-conductive lines on a flat surface or a flat plate. In an embodiment, the antenna structure 161 may include a patch antenna, a monopole antenna, a dipole antenna, or an inverted-F-antenna according to the arrangement or shape of the electrically-conductive bodies. Then antenna structure may be configured to perform at least one of, for example, near-field communication, wireless power transmission/reception, and magnetic secure transmission (MST). However, it is noted that wireless communication performed through the antenna structure 161 is not limited thereto. For example, the electronic device 100 may use the antenna structure 161 to access a mobile or cellular communication network, a local area network (LAN), a wireless local area network (WLAN), a wide area network (WAN), Internet, or a small area network (SAN). According to an embodiment, the antenna structure 161 may include a first antenna 161a for magnetic secure transmission (MST) and a second antenna 161b for near-field communication and/or wireless charging (wireless power transmission). In an embodiment, the first antenna 161a may be configured to perform near-field communication and/or wireless charging, and the second antenna 161b may be used for magnetic secure transmission.

According to various embodiments, the antenna structure 161, for example, the first antenna 161a and/or the second antenna 161b, may be provided on an attachment sheet 163, and may be disposed in the first structure 101. For example, in a state in which the first antenna 161a and the second antenna 161b are disposed on the attachment sheet 163, the attachment sheet 163 may be attached to the first structure 101 (e.g., the second surface A2). According to an embodiment, the antenna structure 161 may be disposed to substantially overlap the first region A1. In FIGS. 2, 4A and/or 4B, the first antenna 161a and the second antenna 161b are illustrated, but, in an actual product, the antenna structure 161 may be hidden so as to be invisible to the naked eyes of a user.

According to various embodiments, in the configuration in which the antenna structure 161 is disposed in the first structure 101, when the second region A2 is received in the second structure 102, the antenna structure 161 may be at least partially positioned between the first region A1 and the second region A2. For example, in the closed state in FIG. 1, the antenna structure 161 may be positioned to face the second structure 102 (e.g., the third plate 121c). In the closed state, when seen through the front surface or rear surface of the electronic device 100, the entire antenna structure 161 may substantially overlap the first region A1, and at least a portion of the antenna structure 161 may overlap the second region A2.

According to various embodiments, in the configuration in which the antenna structure 161 is disposed in the first structure 101, while the second region A2 is visually exposed out of the second structure 102, the antenna structure 161 may be positioned so as not to at least partially face the second structure 102. For example, in the opened state in FIG. 2, the antenna structure 161 may be substantially exposed to an outer space. In another example, the first structure 101 may further include an outer housing (e.g., the outer housing 111d in FIG. 4B) in a direction in which an antenna signal from the antenna structure 161 is radiated. In an embodiment, the outer housing 111d may at least partially include the attachment sheet 163 in FIG. 3. When the outer housing 111d is further included, the antenna structure 161 may not be exposed to the outer space. The outer housing 111d may visually hide the antenna structure 161, and may be made of a radio wave-transmitting material (e.g., polymer). For example, the antenna structure 161 may wirelessly access an external electronic device or network even when being visually hidden by the outer housing 111d. A conductive material (e.g., a metal material of the first structure 101 or the second structure 102) constituting the electronic device 100 may be an obstacle to performing wireless communication using the antenna structure 161. In an embodiment, the flexible display 103 may operate as a shielding structure for blocking radio waves. In an embodiment, the antenna structure 161 is disposed in the first structure 101, and thus may be exposed to the outer space in the opened state. For example, the antenna structure 161 may be provided a stable wireless communication environment while avoiding the obstacle or shielding structure which may be formed in the electronic device 100.

Figure 5A:
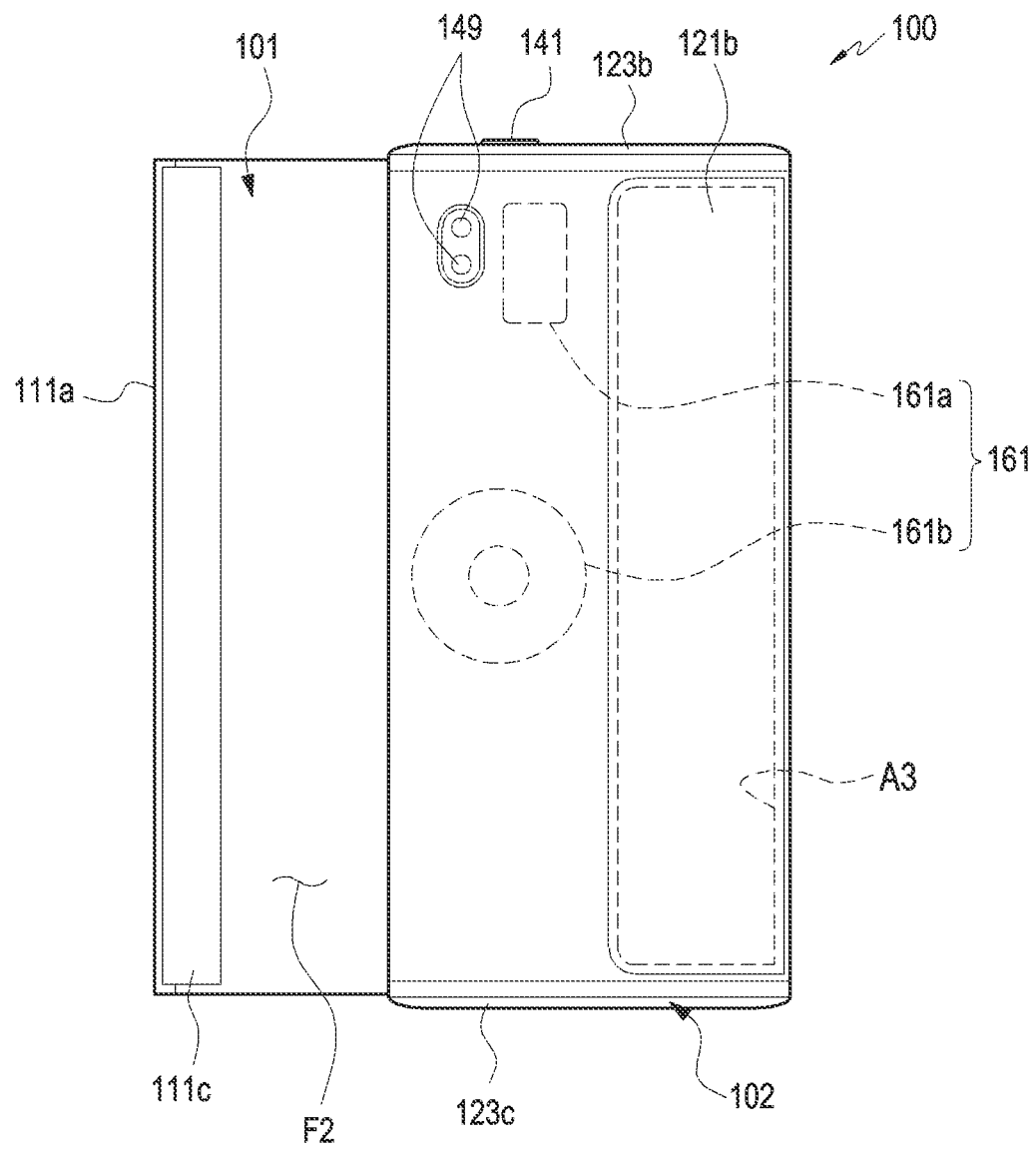
FIG. 5A illustrates another example of an electronic device according to an embodiment of the disclosure.

FIG. 5A illustrates another example of an electronic device (e.g., the electronic device 100 in FIGS. 1 to 3) according to an embodiment of the disclosure.

Figure 5B:
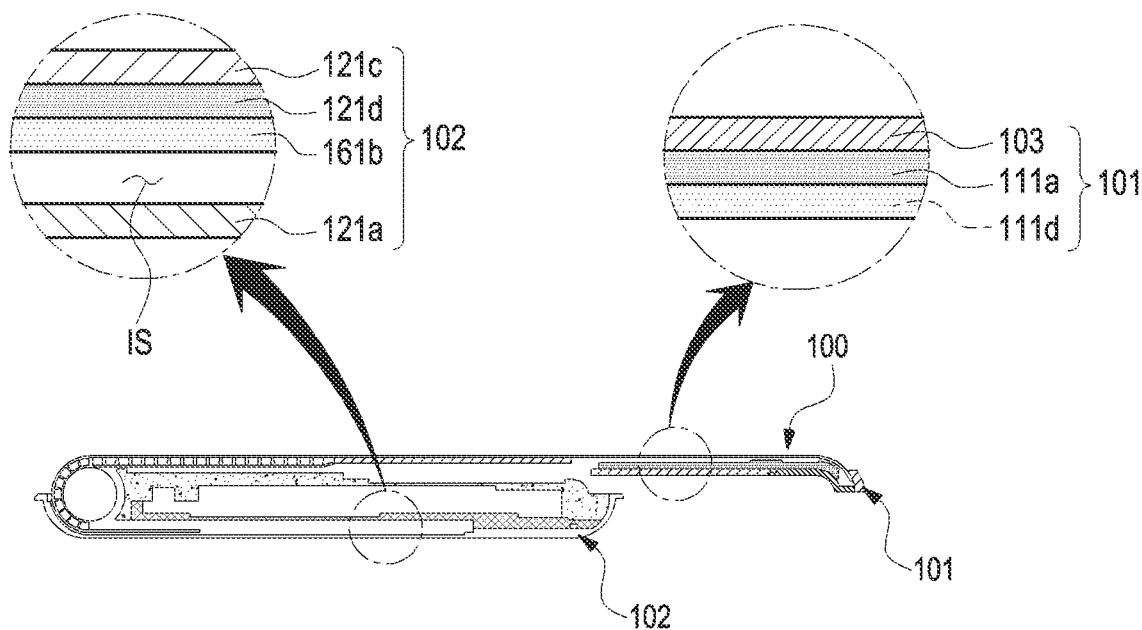
FIG. 5B is a view illustrating another embodiment regarding a placement of an antenna structure in an electronic device according to an embodiment of the disclosure.

FIG. 5B is a view illustrating another embodiment regarding the placement of an antenna structure in an electronic device (e.g., the electronic device 100 in FIGS. 1 to 3) according to an embodiment of the disclosure.

FIG. 5B illustrates, for example, a configuration in which the antenna structure 161 (e.g., the second antenna 161b) is disposed in the second structure 102.

Referring to FIGS. 5A and 5B, the antenna structure 161 may be disposed on the second structure 102, for example, on at least one of the second plate 121a, the rear plate 121b, or the printed circuit board 121d. For example, in a state in which the first antenna 161a and the second antenna 161b are disposed on the attachment sheet 163, the attachment sheet 163 may be attached to the second structure 102. In an embodiment, the antenna structure 161 may attached to the second plate 121a, and may be disposed to face the rear plate 121b or the support member. In another embodiment, as illustrated in FIG. 5B, the antenna structure 161 may be disposed on the printed circuit board 121d, and may be disposed to face the second plate 121a. For example, the antenna structure 161 may be disposed in the second structure 102, regardless of whether the second region A2 is received in the second structure 102 or is visually exposed to the outside.

According to various embodiments, in the configuration in which the antenna structure 161 is disposed in the second structure 102, when the second region A2 is received in the second structure 102, the antenna structure 161 may be at least partially positioned between the first region A1 and the second region A2. For example, in the closed state in FIG. 1, when seen through the front or rear surface of the electronic device 100, the entire antenna structure 161 may substantially overlap the first region A1, and at least a portion of the antenna structure 161 may overlap the second region A2. For example, in the closed state, at least a portion (e.g., the second region A2 in FIG. 3) of the flexible display 103 may be received in an inner gap or space (IS), and, when seen from below the second plate 121a, at least a portion (e.g., the second antenna 161b) of the flexible display 103 may be positioned to overlap the second region A2 of the flexible display 103.

According to various embodiments, in the configuration in which the antenna structure 161 is disposed in the second structure 102, when the second region A2 is visually exposed out of the second structure 102, the antenna structure 161 and the second region A2 may be positioned to face different directions. For example, in the closed state, the second region A2 may be positioned to face the same direction as the antenna structure 161, and, in the opened state, the second region A2 may be positioned to face a direction opposite to the direction faced by the antenna structure 161. In the opened state in FIG. 5A, the antenna structure 161 may be positioned in the second structure 102, but, at least, a shielding structure by the flexible display 103 (e.g., the second region A2) is removed, and thus the antenna structure 161 may perform wireless communication in the direction of the rear surface of the electronic device 100.

Figure 5C:
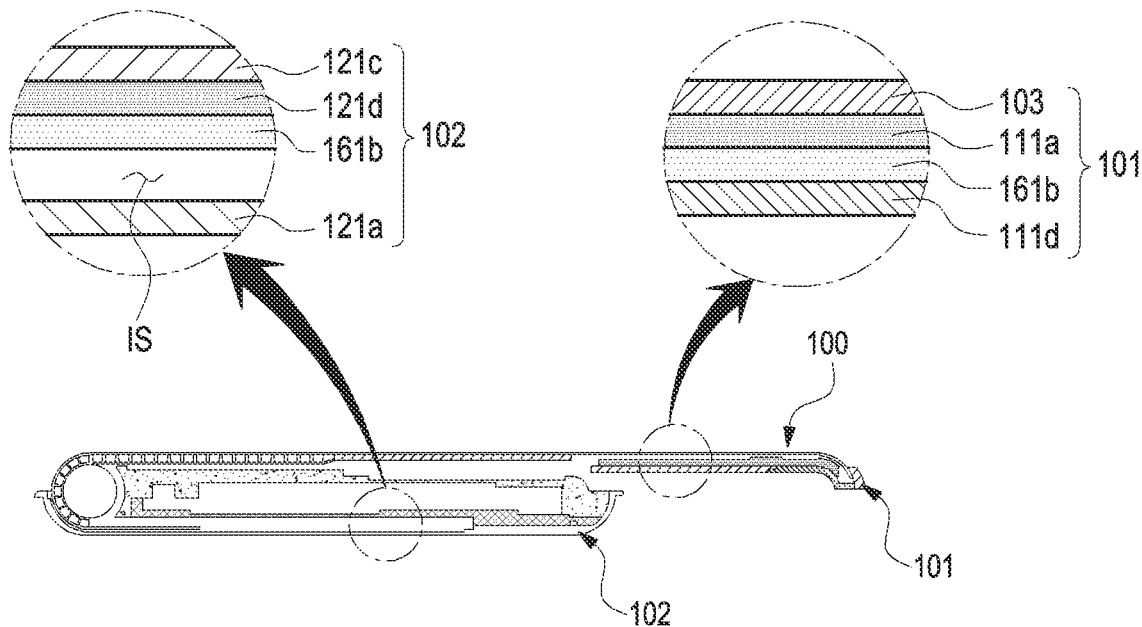
FIG. 5C is a view illustrating another embodiment regarding a placement of an antenna structure in an electronic device according to an embodiment of the disclosure.

FIG. 5C is a view illustrating another embodiment regarding the placement of an antenna structure in an electronic device according to an embodiment of the disclosure.

Referring to FIG. 5C, one of multiple antenna structures 161 (e.g., the first antenna 161a and/or the second antenna 161b) may be provided in the first structure 101, and the other may be provided in the second structure 102. In an embodiment, the antenna structure 161 disposed in the first structure 101 may be identical to the antenna structure 161 disposed in the second structure 102. For example, the electronic device 100 may be configured to perform wireless communication by using all of the multiple antenna structure 161, or may be configured to, as necessary, evaluate the quality of a signal from each antenna structure 161, select one antenna structure, and perform wireless communication. In another embodiment, in another embodiment, the antenna structure 161 disposed in the first structure 101 may be different from the antenna structure 161 disposed in the second structure 102. For example, the antenna structure 161 disposed in the first structure 101 may perform wireless communication according to a communication protocol that is different from that of the antenna structure 161 disposed in the second structure 102.

In the detailed description below, an element, which can be easily understood through a preceding embodiment, may be identically given a reference numeral in drawings or the reference numeral may be omitted. Further, a detailed description thereof may be omitted. An electronic device (e.g., the electronic device 100 in FIGS. 1 to 3) according to various embodiments disclosed herein may be implemented by selectively combining elements of different embodiments, and an element of one embodiment may be replaced with an element of another embodiment. For example, it should be noted that the disclosure is not limited to a specific drawing or embodiment.

Operations of the electronic device 100, described below, may be performed by a processor included in the electronic device 100. For convenience in description, a description will be made assuming that a subject of the operations is the electronic device 100.

Figure 6:
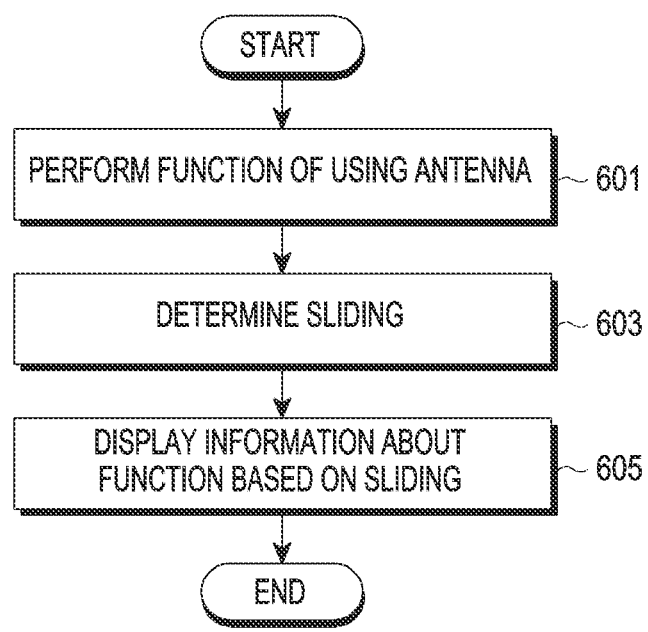
FIG. 6 is a flowchart illustrating operations of an electronic device according to an embodiment of the disclosure.

FIG. 6 is a flowchart illustrating operations of an electronic device according to an embodiment of the disclosure.

Referring to FIG. 6, according to various embodiments, in operation 601, the electronic device 100 may perform a function of using an antenna included in the antenna structure 161. For example, when a designated application (for example, a payment application or a wireless charging application) is executed, the electronic device 100 may perform a function of using an antenna (for example, the first antenna 161a or the second antenna 161b) related to the corresponding application.

According to various embodiments, in operation 603, the electronic device 100 may determine whether the first structure 101 has slid. The electronic device 100 may perform, based on the sliding of the first structure 101, a function of using a designated antenna (for example, the first antenna 161a or the second antenna 161b). For example, when the first structure 101 slides to a predetermined position, the electronic device 100 may perform an operation related to a payment function. Alternatively, when the first structure 101 slides to the predetermined position, the electronic device 100 may perform an operation related to a wireless charging function.

According to various embodiments, in operation 605, the electronic device 100 may display, based on the sliding of the first structure 101, information about the function of using the designated antenna (for example, the first antenna 161a or the second antenna 161b). For example, the electronic device 100 may display guide information on the flexible display 103 such that the first structure 101 slides to the predetermined position. When the first structure 101 slides to the predetermined position, the electronic device 100, the electronic device 100 may display information for performing a function of a corresponding application. For example, when it is determined that the first structure 101 has slid, the electronic device 100 may display payment function-related information (for example, payment request information and/or payment execution information). Alternatively, the electronic device 100 may display, when it is determined that the first structure 101 has slid, wireless charging function-related information (for example, charging state information).

Figure 7:
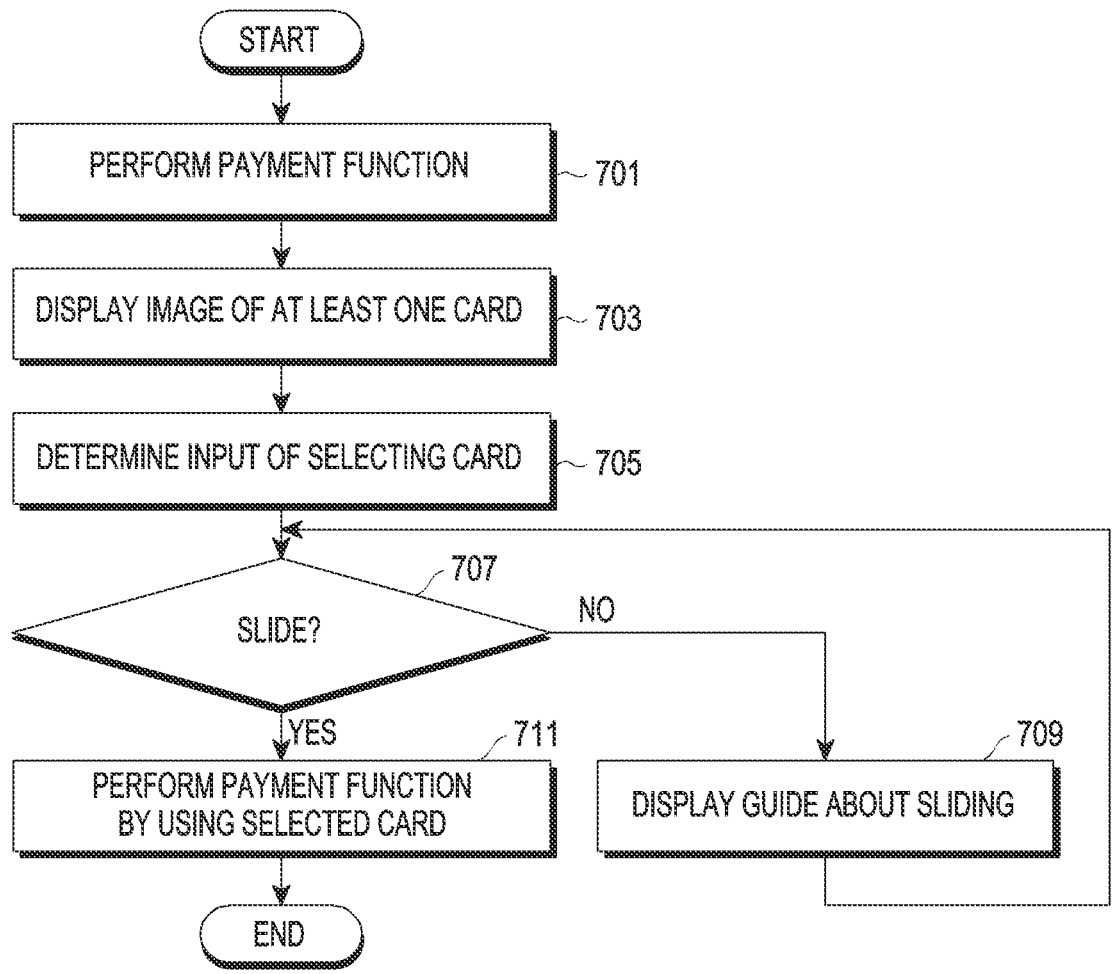
FIG. 7 is a flowchart illustrating an operation of performing a payment function by an electronic device according to an embodiment of the disclosure.

FIG. 7 is a flowchart illustrating an operation of performing a payment function by an electronic device according to an embodiment of the disclosure.

Referring to FIG. 7, according to various embodiments, in operation 701, the electronic device 100 may perform a payment function. For example, the electronic device 100 may perform a payment function when a payment application is executed.

According to various embodiments, in operation 703, the electronic device 100 may display an image of at least one credit card for payment on the flexible display 103.

According to various embodiments, in operation 705, the electronic device 100 may determine an input for selecting one credit card (or one credit card image) acquired by a user. For example, the electronic device 100 may determine one of the at least one credit card on the basis of the user input by touch of the user.

According to various embodiments, in operation 707, the electronic device 100 may determine whether the first structure 101 has slid.

According to various embodiments, when the first structure 101 has not slid (No in operation 707), the electronic device 100 may display guide information about sliding on the flexible display 103 in operation 709. For example, the guide information may include an object and/or text for guiding sliding in the designated direction.

According to various embodiments, when the first structure 101 has slid (Yes in operation 707), the electronic device 100 may perform a payment function by using the selected credit card in operation 711. The electronic device 100 may display an image of the selected credit card on the flexible display 103. The electronic device 100 may also display, on the flexible display 103, an object indicating a position at which an external electronic device (for example, a point of sale (POS) terminal) is to be brought into contact with the electronic device 100. Further, the electronic device 100 may display information about a payment state on the flexible display 103.

FIGS. 8A to 8F are views illustrating an operation of performing a payment function by an electronic device according to various embodiments of the disclosure.

Figure 8A:
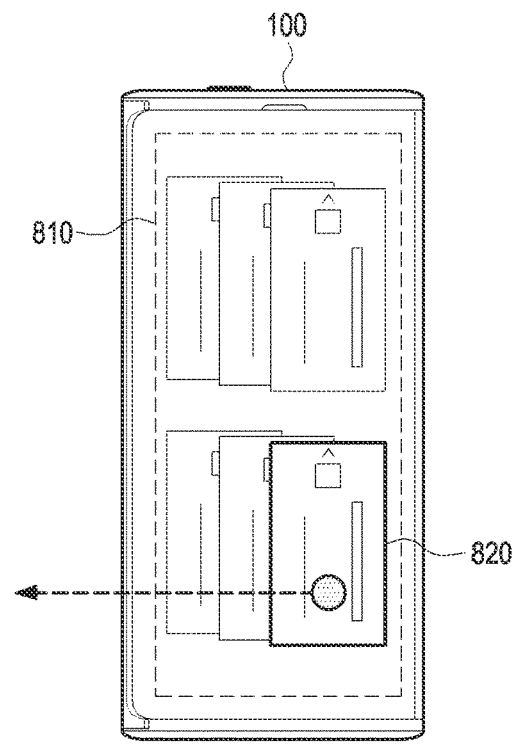
FIGS. 8A, 8B, 8C, 8D, 8E, and 8F are views illustrating an operation of performing a payment function by an electronic device according to various embodiments of the disclosure.

Referring to FIG. 8A, when a payment function is performed, the electronic device 100 may display, on a flexible display (for example, the flexible display 103 in FIG. 1), multiple card images 810 corresponding to multiple credit cards stored in the electronic device 100. For example, the arrangement of the multiple card images 810 may be determined based on at least one among a recent use history, a correlation with a product for which payment is to be made, and the number of times of being used. The electronic device 100 may determine what product is the product for which payment is to be made. For example, the electronic device 100 may identify position information or identify a beacon signal output from a beacon signal transmitter installed in a store, thereby determining what product is the product for which payment is to be made. Alternatively, when the product for which payment is to be made is an online product, the electronic device 100 may identify information at the latest visited web site to determine what product is the product for which payment is to be made.

According to various embodiments, the electronic device 100 may identify an input for selecting a first card image 820 from among the multiple card images 810 acquired by the user.

According to various embodiments, after the first card image 820 is selected, the electronic device 100 may determine sliding of a first structure (for example, the first structure 101 in FIG. 1). The first structure 101 may slide after the touch input for selecting the first card image 820 is released, or may slide while the touch input for the first card image 820 is maintained.

That is, the electronic device 100 may provide, through sliding, the same usability as an operation of sliding a credit card out of a wallet.

Figure 8B:
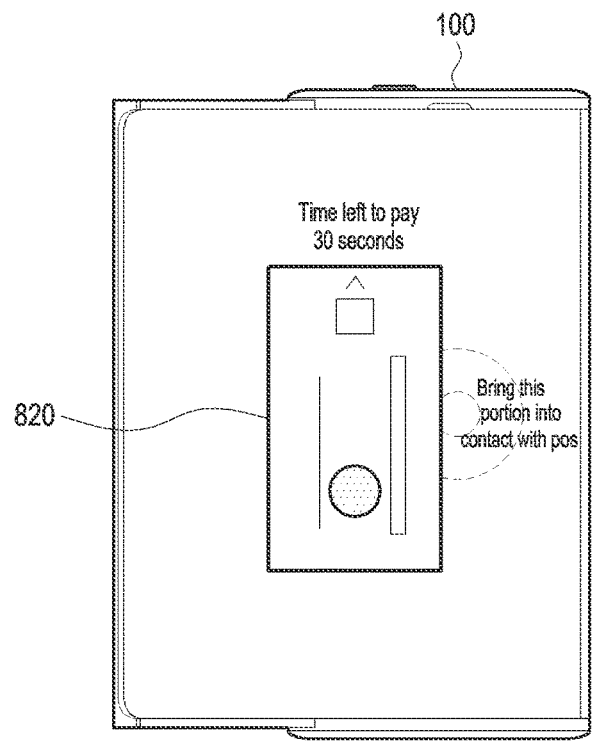

Referring to FIG. 8B, according to various embodiments, when the sliding of the first structure 101 is determined, the electronic device 100 may display, the selected first card image 820 on the flexible display 103 which has been unrolled. For example, the electronic device 100 may display the first card image 820 in a region of the flexible display 103 that corresponds to the position of the first antenna 161a included in the antenna structure 161. Further, the electronic device 100 may also display information about a payment execution state on the flexible display 103.

Figure 8C:
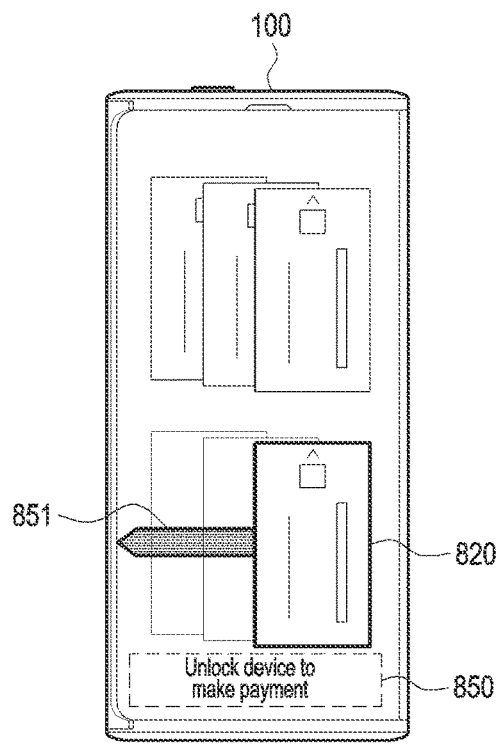

Referring to FIG. 8C, according to various embodiments, when sliding of the first structure 101 is not determined, the electronic device 100 may display, guide information (for example, reference numerals 850 and/or 851) about the sliding on the flexible display 103. For example, the electronic device 100 may display text information 850 about the sliding and/or an object 851 regarding a movement direction.

According to various embodiments, the number and arrangement of the multiple card images 810 illustrated in FIG. 8A may be not limited thereto. That is, the electronic device 100 may display the multiple card images in various forms and arrangements. Further, the display form and arrangement of multiple card images may be configured and changed by the user or automatically.

Figure 8D:
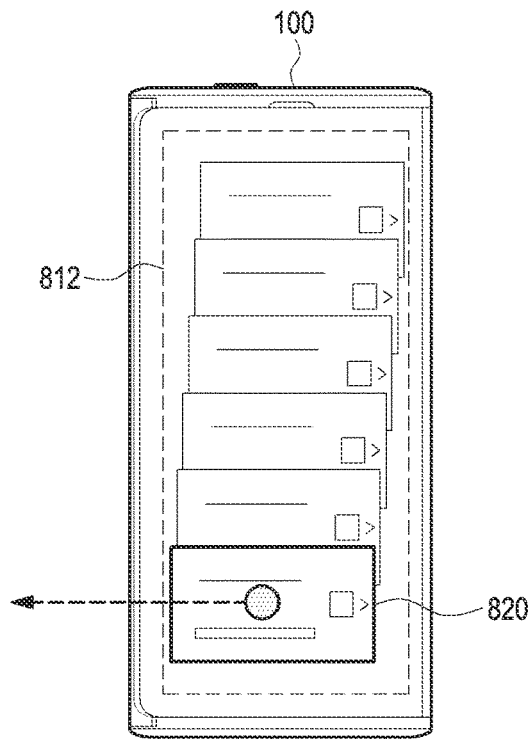

According to various embodiments, referring to FIG. 8D, the electronic device 100 may display multiple card images 812 in a vertical arrangement. For example, the arrangement of the multiple card images 812 may be determined based on at least one of a recent use history, a correlation with a product for which payment is to be made, and the number of times of being used. For example, a card image corresponding to a recently used card may be positioned at the upper end or the lower end. The electronic device 100 may select the first card image 820 from among the multiple card images 812 on the basis of a user input, and may cause the first structure 101 to slide.

Figure 8E:
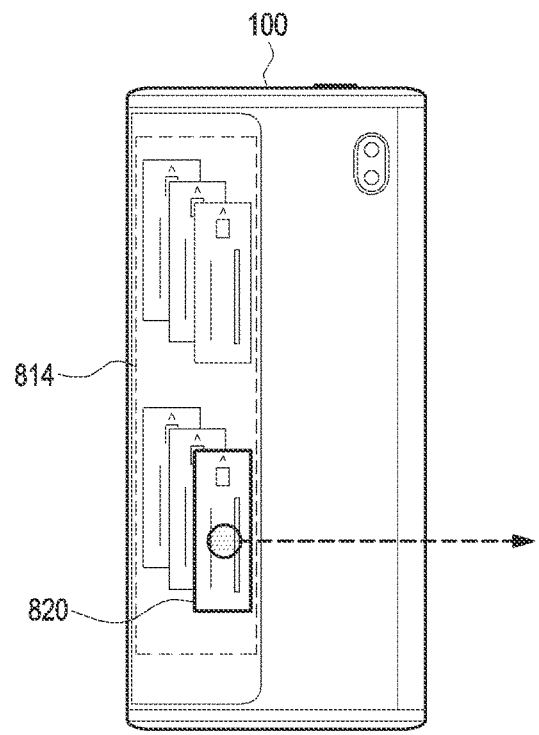
Figure 8F:
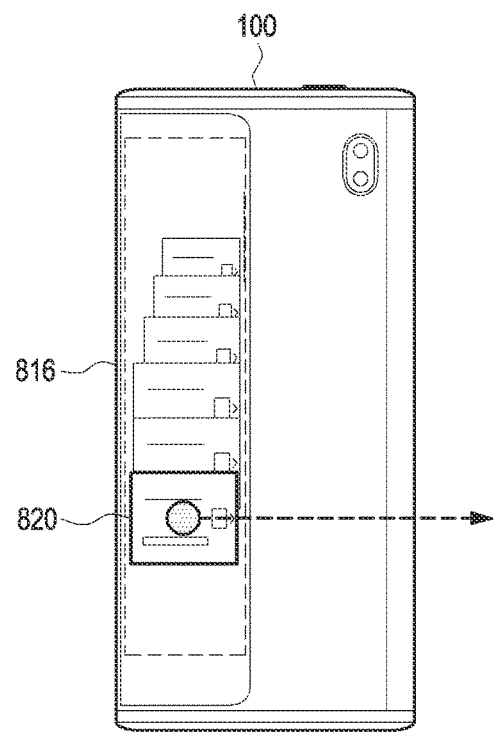

According to various embodiments, referring to FIGS. 8E and 8F, the electronic device 100 may also display multiple card images 814 or 816 in a display region of the rear surface of the electronic device. For example, the electronic device 100 may display multiple card images 814 in the form illustrated in FIG. 8E.

Referring to FIG. 8F, alternatively, the electronic device 100 may display multiple card images 816 in the form. The electronic device 100 may select the first card image 820 from among the multiple card images 814 or 816 on the basis of a user input, and may cause the first structure 101 to slide. For example, the direction of sliding of the first structure 101 may be opposite to the direction of sliding of the first structure 101 in FIGS. 8A and 8D.

Figure 9:
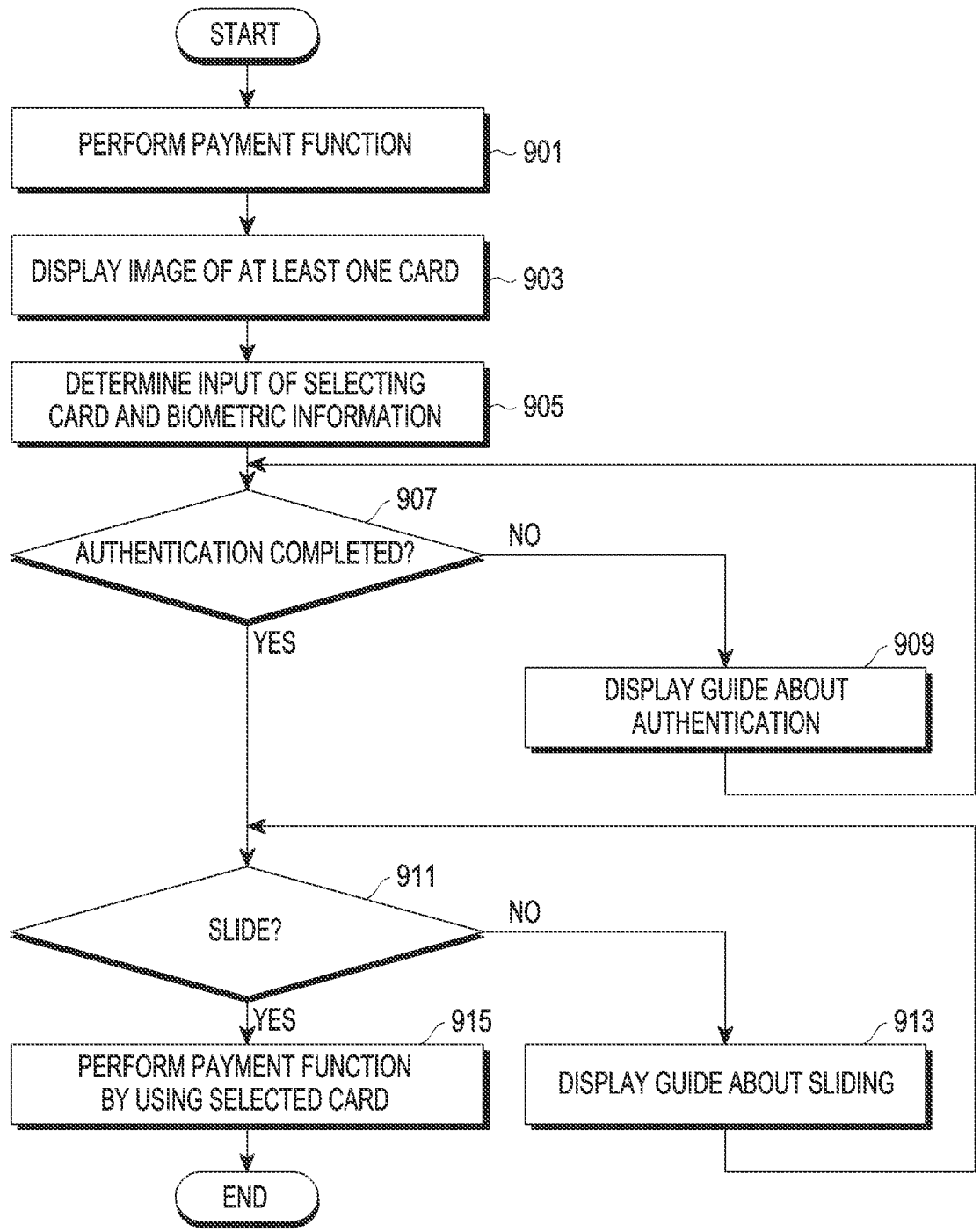
FIG. 9 is a flowchart illustrating an authentication operation and a payment function performance operation of an electronic device according to an embodiment of the disclosure.

FIG. 9 is a flowchart illustrating an authentication operation and a payment function performance operation of an electronic device according to an embodiment of the disclosure.

Referring to FIG. 9, according to various embodiments, in operation 901, the electronic device 100 may perform a payment function. For example, the electronic device 100 may perform a payment function when a payment application is executed.

According to various embodiments, in operation 903, the electronic device 100 may display, on the flexible display 103, an image of at least one credit card for payment.

According to various embodiments, in operation 905, the electronic device 100 may determine an input for selecting one credit card (or one credit card image) acquired by a user. Further, the electronic device 100 may determine biometric information for authentication, which has been acquired from the user. For example, the biometric information may include fingerprint information, iris information, face information, and/or voice information.

According to various embodiments, the electronic device 100 may also determine authentication information instead of the biometric information. For example, the authentication information may be a designated pattern input, a designated gesture input, a password, or a PIN code.

According to various embodiments, in operation 907, the electronic device 100 may determine whether authentication has been completed. For example, the electronic device 100 may compare pre-stored biometric information with biometric information acquired from the user to perform authentication. When the pre-stored biometric information matches the biometric information acquired from the user, the electronic device 100 may determine that the authentication has been completed. Alternatively, the electronic device 100 may also compare pre-stored authentication information with authentication information acquired from the user to perform an authentication operation.

According to various embodiments, when authentication has not been completed (No in operation 907), the electronic device 100 may display guide information about authentication on the flexible display 103 in operation 909. For example, the guide information about authentication may include information indicating that authentication has not been completed, and information requesting authentication again.

According to various embodiments, when authentication has been completed (Yes in operation 907), the electronic device 100 may determine, in operation 911, whether the first structure 101 has slid.

According to various embodiments, when the first structure 101 has not slid (No in operation 911), the electronic device 100 may display guide information about sliding on the flexible display 103 in operation 913. For example, the guide information about sliding may include an object and/or text for guiding sliding in a designated direction.

According to various embodiments, when the first structure 101 has slid (Yes in operation 911), the electronic device 100 may perform a payment function by means of the selected card in operation 915. The electronic device 100 may display an image of the selected card on the flexible display 103. The electronic device 100 may also display, on the flexible display 103, an object indicating a position at which an external electronic device (for example, a POS terminal) is to be brought into contact with the electronic device 100.

FIGS. 10A to 10D are views illustrating an authentication operation and a payment function performance operation of an electronic device according to various embodiments of the disclosure.

Figure 10A:
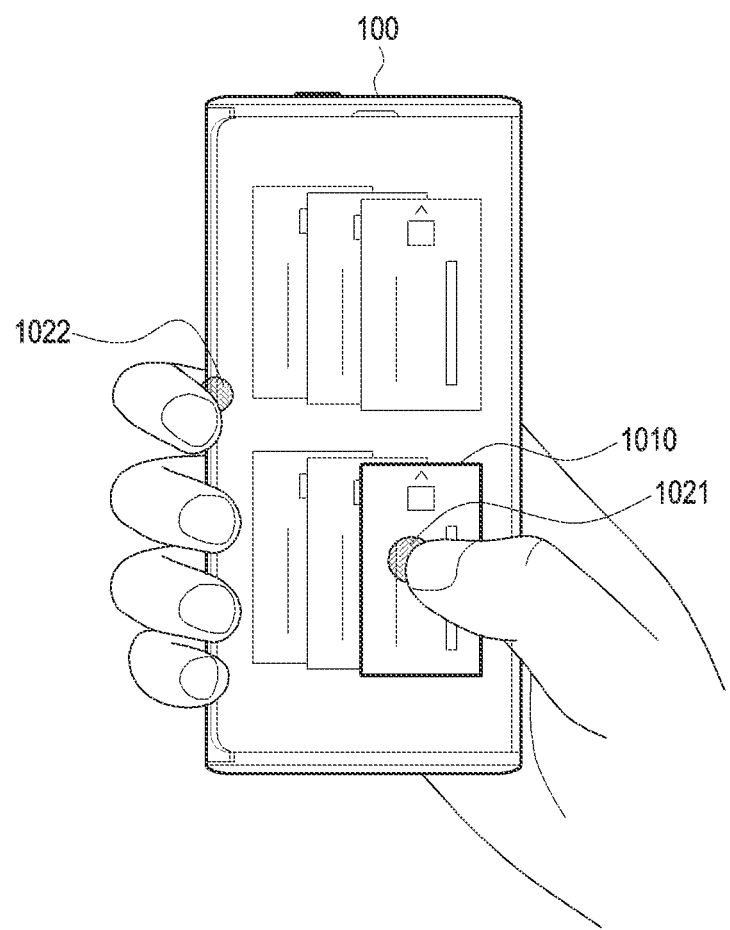
FIGS. 10A, 10B, 10C, and 10D are views illustrating an authentication operation and a payment function performance operation of an electronic device according to various embodiments of the disclosure.

Referring to FIG. 10A, the electronic device 100 may select a first card image 1010 from among multiple card images in response to a touch input of a user. When the touch input of the user is determined, the electronic device 100 may acquire first fingerprint information 1021 through the flexible display 103. In this case, a fingerprint sensor may be disposed on the rear surface of the flexible display 103, or may be included in the flexible display 103. Alternatively, the electronic device 100 may acquire second fingerprint information 1022 through a side wall part of the electronic device 100. In this case, a fingerprint sensor may be disposed or included in the side wall part of the electronic device 100.

Figure 10B:
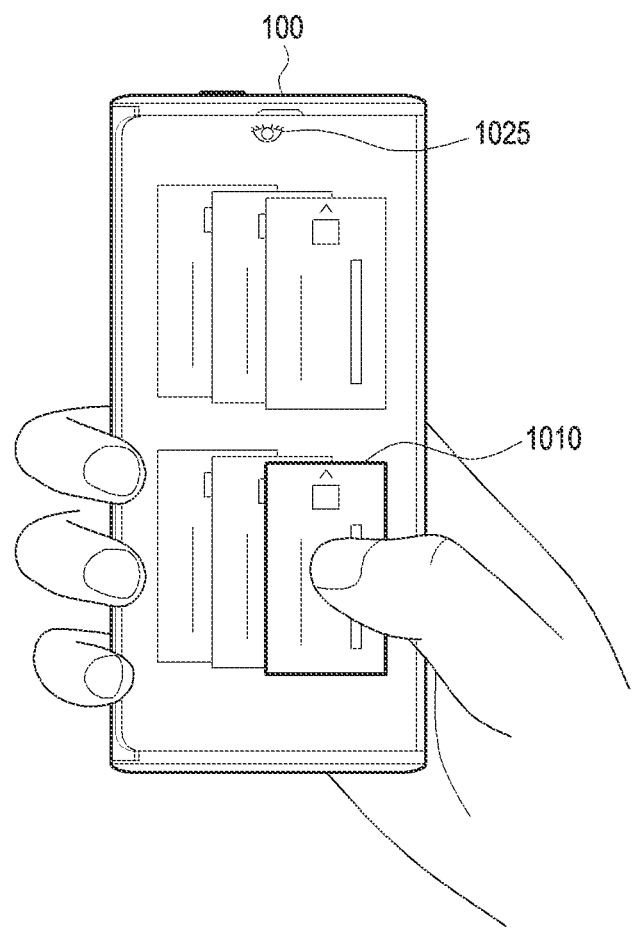

According to various embodiments, referring to FIG. 10B, when the touch input of the user is determined, the electronic device 100 may acquire iris information 1025 through a camera disposed at the front surface of the flexible display 103. Alternatively, the electronic device 100 may also acquire face information through the camera.

According to various embodiments, the electronic device 100 may compare the fingerprint information or the iris information acquired from the user with stored biometric information to perform an authentication operation.

Figure 10C:
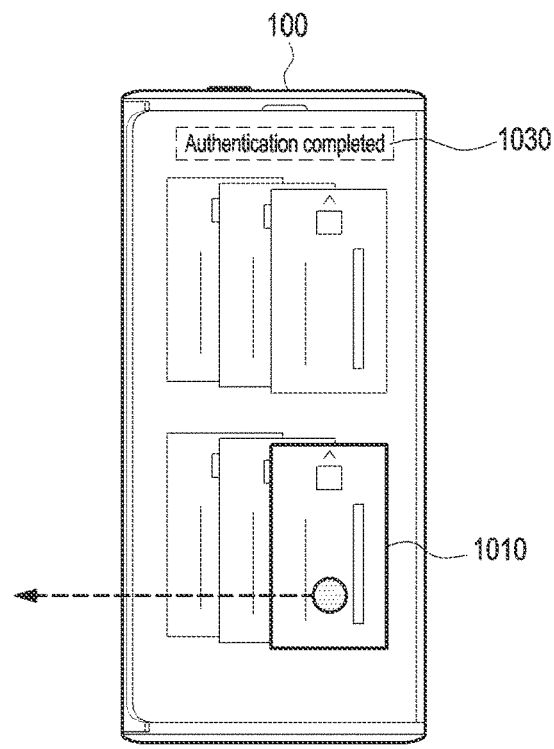

According to various embodiments, referring to FIG. 10C, when authentication is completed, the electronic device 100 may display, on the flexible display 103, an object 1030 indicating the completion of authentication. After authentication is completed, the electronic device 100 may determine that the first structure 101 is slid by the user, and may perform a payment function by using a selected credit card. If authentication has not been completed, the electronic device 100 may not perform a payment function even when the first structure 101 is slid by the user.

Figure 10D:
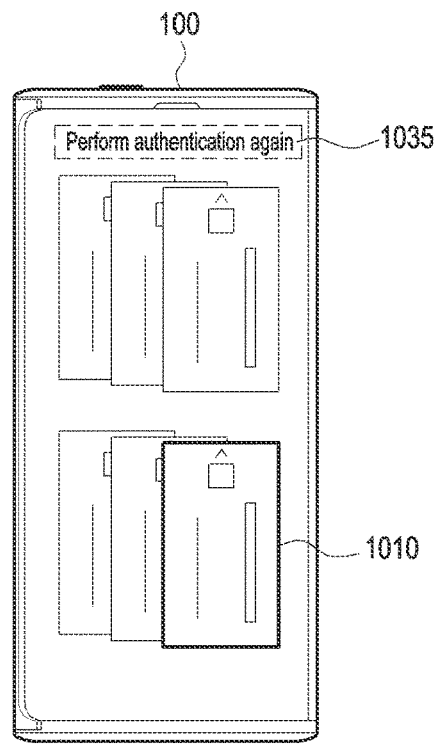

According to various embodiments, referring to FIG. 10D, when authentication is not completed, the electronic device 100 may display, on the flexible display 103, an object 1035 that requests for authentication again. Further, when authentication is not completed, the electronic device 100 may also display a message indicating a failure in authentication.

Figure 11:
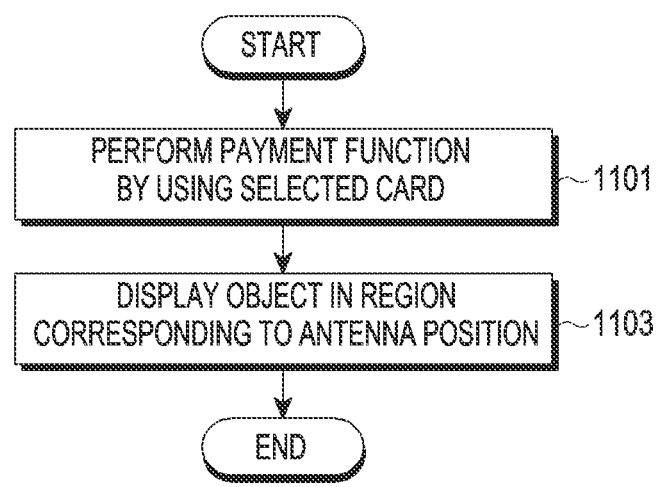
FIG. 11 is a flowchart illustrating an operation of providing a guide regarding a payment function by an electronic device according to an embodiment of the disclosure.

FIG. 11 is a flowchart illustrating an operation of providing a guide regarding a payment function by an electronic device according to an embodiment of the disclosure.

Referring to FIG. 11, in operation 1101, the electronic device 100 may perform a payment function by using a selected card.

According to various embodiments, in operation 1103, the electronic device 100 may display a payment-related object in a region of a flexible display that corresponds to the position of the first antenna 161*a*. For example, the payment-related object may include information indicating a position at which an external electronic device (for example, a POS terminal) is brought into contact with the electronic device 100 for payment.

Figure 12A:
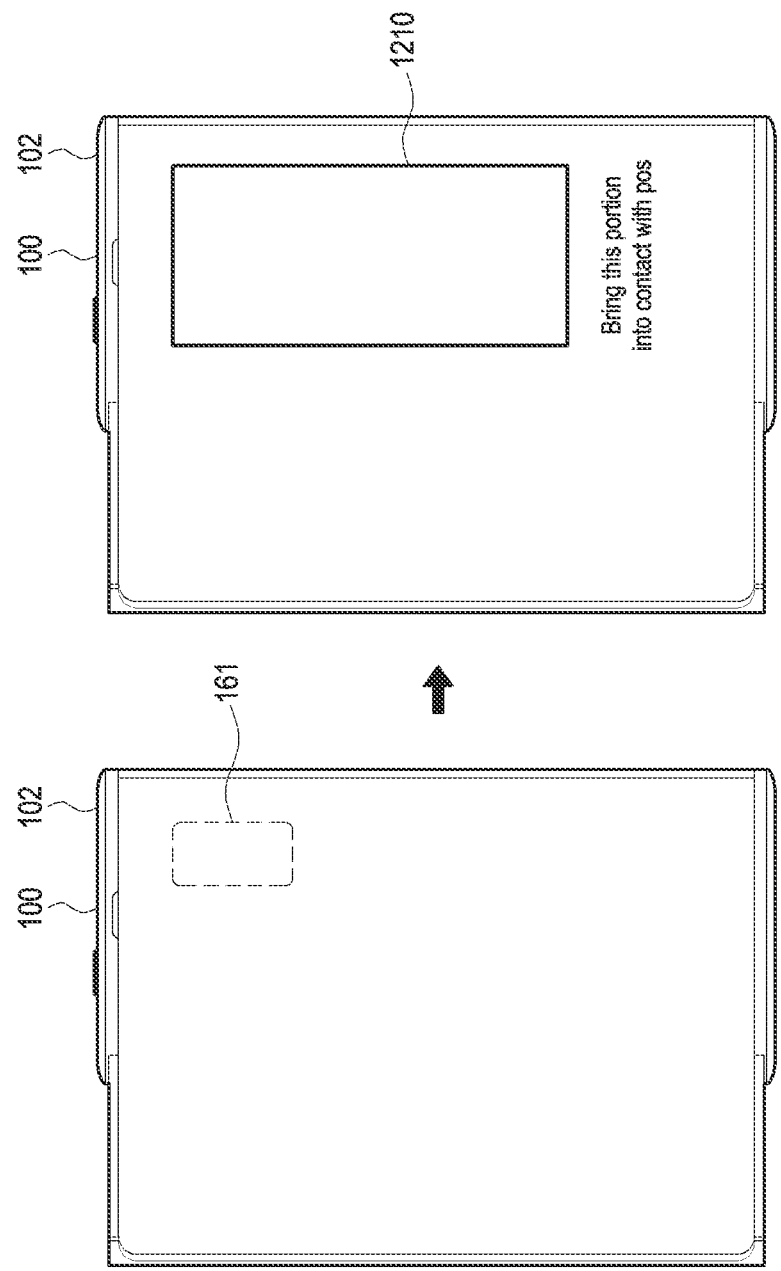
FIGS. 12A and 12B are views illustrating an operation of providing a guide regarding a payment function by an electronic device according to various embodiments of the disclosure.
Figure 12B:
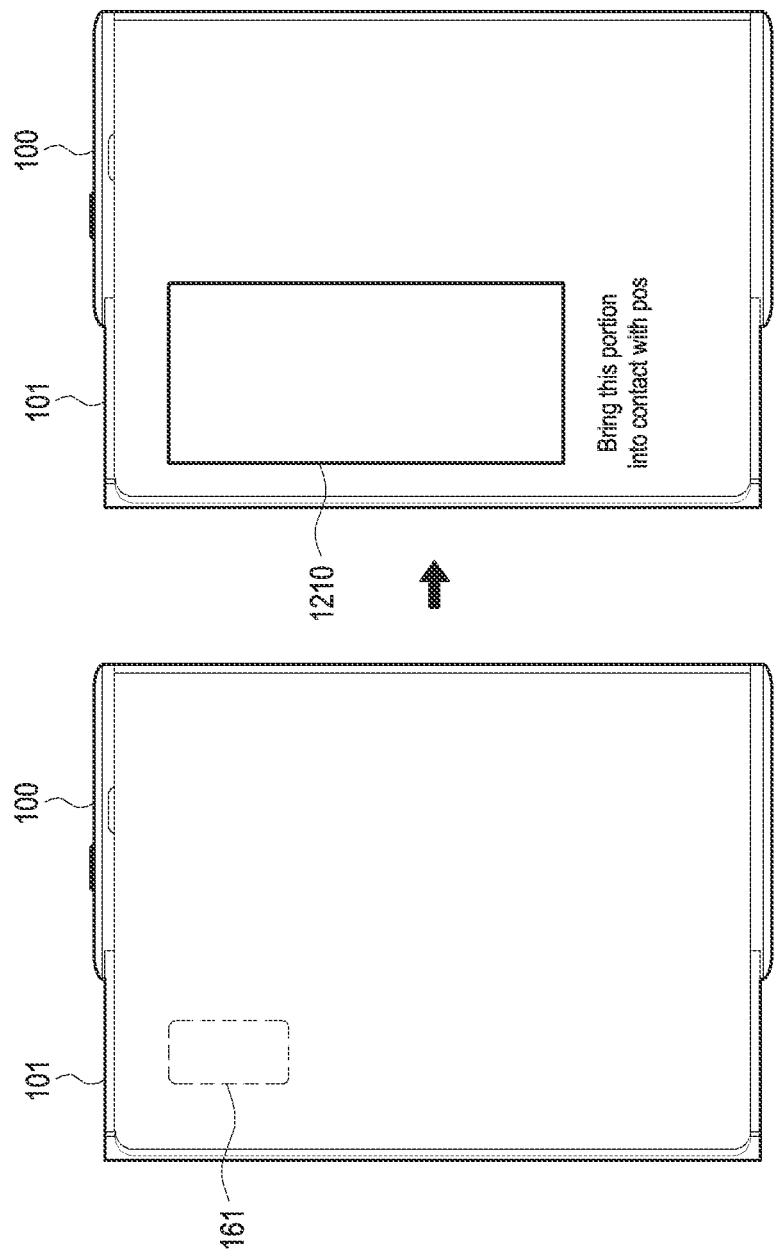

FIGS. 12A and 12B are views illustrating an operation of providing a guide regarding a payment function by an electronic device according to various embodiments of the disclosure.

According to various embodiments, referring to FIG. 12A, the first antenna 161*a* may be included in the second structure 102. For example, the position of the first antenna 161*a* may not change according to sliding of the first structure 101. The electronic device 100 may control the flexible display 103 such that an object 1210 is displayed in a region corresponding to the position of the first antenna 161*a*. The object 1210 may include information indicating a position at which an external electronic device (for example, a POS terminal) is brought into contact with the electronic device 100 for payment.

According to various embodiments, referring to FIG. 12B, the first antenna 161*a* may be included in the first structure 101. For example, the position of the first antenna 161*a* may change depending on sliding of the first structure 101. The electronic device 100 may display the object 1210 in a region of the flexible display 103 that corresponds to the position of the first antenna 161*a*.

According to various embodiments, when the first antenna 161*a* is included in both the first structure 101 and the second structure 102, the electronic device 100 may display, in at least one region in which the first antenna 161*a* is positioned, an object indicating a position at which an external electronic device (for example, a POS terminal) is brought into contact with the electronic device 100.

Therefore, the electronic device 100 can provide a smooth payment function by providing a user with the position of the first antenna 161*a* that changes depending on sliding of the first structure 101.

Figure 13:
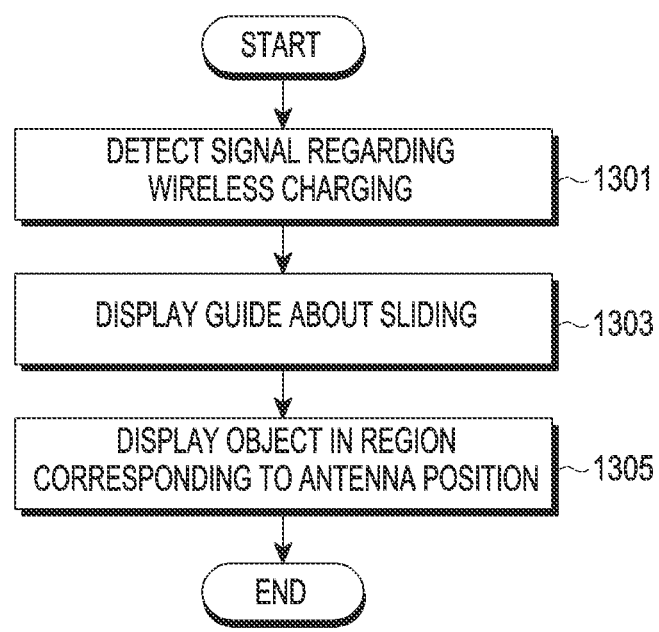
FIG. 13 is a flowchart illustrating an operation of performing a wireless charging function by an electronic device according to an embodiment of the disclosure.

FIG. 13 is a flowchart illustrating an operation of performing a wireless charging function by an electronic device according to an embodiment of the disclosure.

According to various embodiments, referring to FIG. 13, in operation 1301, the electronic device 100 may perform a wireless charging function. For example, when power is wirelessly received from an external electronic device, the electronic device 100 may perform a wireless charging function in response to a signal received from the external electronic device. Alternatively, when wirelessly transmitting power to the external electronic device, the electronic device 100 may perform a wireless charging function through a wireless charging application.

According to various embodiments, in operation 1303, the electronic device 100 may display guide information regarding sliding of the first structure 101 in order to perform the wireless charging function. For example, the guide information may include information about an object or text indicating the direction of sliding.

According to various embodiments, in operation 1305, when the first structure 101 slides, the electronic device 100 may display an object in a region of the flexible display 103 that corresponds to the position of the second antenna 161*b*. For example, the object may include information indicating a position at which an external electronic device is brought into contact with the electronic device 100 for wireless charging.

FIGS. 14A to 14D are views illustrating an operation of performing a wireless charging function by an electronic device according to various embodiments of the disclosure.

Figure 14A:
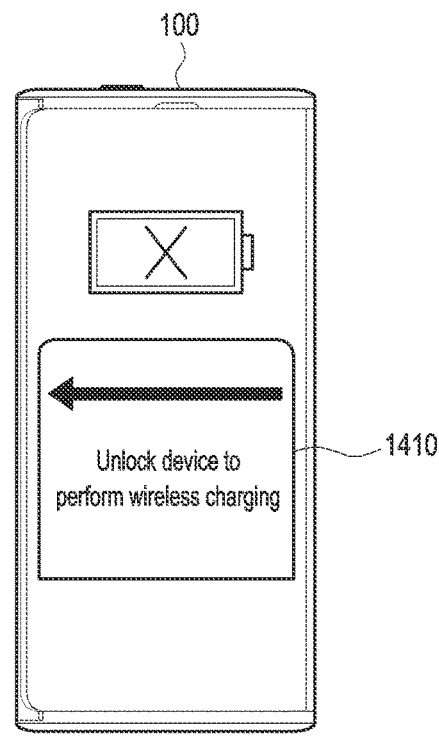
FIGS. 14A, 14B, 14C, and 14D are views illustrating an operation of performing a wireless charging function by an electronic device according to various embodiments of the disclosure.

Referring to FIG. 14A, the electronic device 100 may display guide information 1410 about sliding of the first structure 101 in order to perform a wireless charging function. The guide information 1410 may include a direction object and text information, which relate to sliding.

Figure 14B:
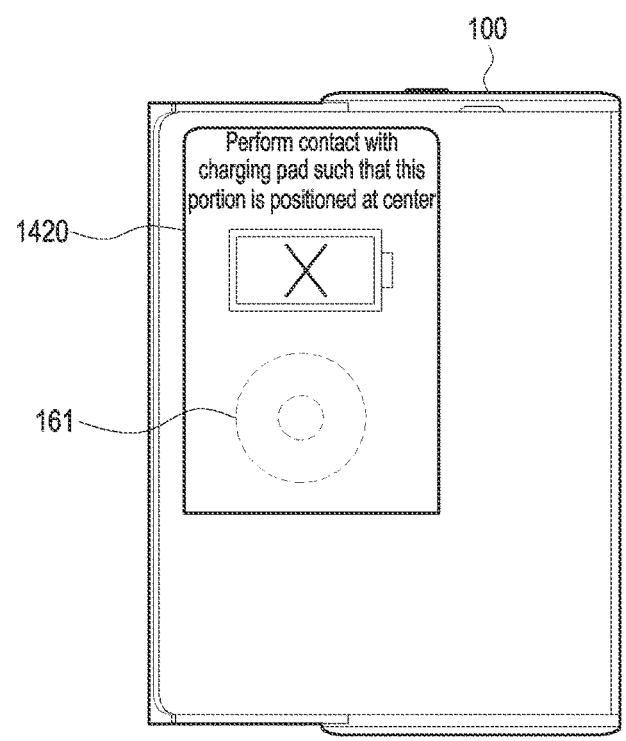

Referring to FIG. 14B, when the first structure 101 slides, the electronic device 100 may display an object 1420 in a region of the flexible display 103 that corresponds to the position of the second antenna 161*b*. For example, the second antenna 161*b* may be included in the first structure 101. For example, the position of the second antenna 161*b* may change depending on sliding of the first structure 101. The electronic device 100 may display the object 1420 in a region of the flexible display 103 that corresponds to the position of the second antenna 161*b*. The object 1420 may include information indicating a position at which an external electronic device (for example, a charging pad) is brought into contact with the electronic device 100 for wireless charging.

Figure 14C:
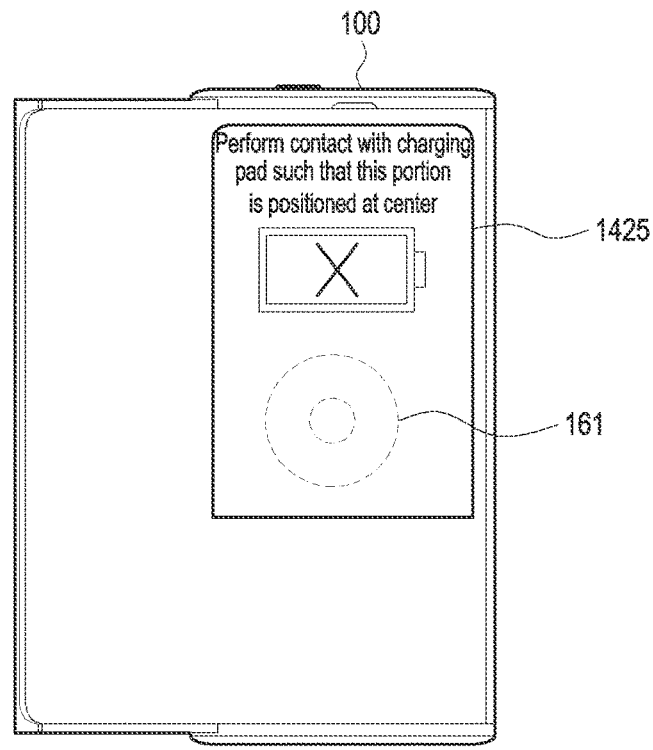

Referring to FIG. 14C, when the first structure 101 slides, the electronic device 100 may display an object 1425 in a region of the flexible display 103 that corresponds to the position of the second antenna 161*b*. For example, the second antenna 161*b* may be included in the second structure 102. For example, the position of the second antenna 161*b* may not change depending on sliding of the first structure 101. The electronic device 100 may control the flexible display 103 such that the object 1425 is displayed in the region corresponding to the position of the second antenna 161*b*. The object 1425 may include information indicating a position at which an external electronic device (for example, a charging pad) is brought into contact with the electronic device 100 for wireless charging.

Figure 14D:
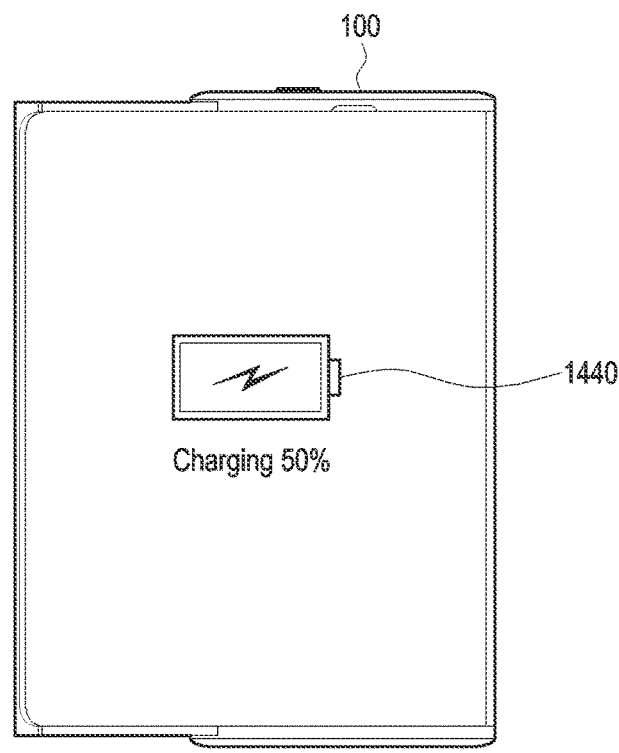

Referring to FIG. 14D, the electronic device 100 may display an object 1440 indicating "charging" when an external electronic device (or a charging pad) is placed to be aligned with the second antenna 161*b* of the electronic device 100.

According to various embodiments, when the second antenna 161*b* is included in both the first structure 101 and the second structure 102, the electronic device 100 may display, in at least one region in which the second antenna 161*b* is positioned, an object indicating a position at which an external electronic device (for example, a charging pad) is brought into contact with the electronic device 100.

Therefore, the electronic device 100 can provide a smooth wireless charging function by providing a user with the position of the second antenna 161*b* that changes depending on sliding of the first structure 101.

The electronic device 1501, 1502, or 1504 in FIG. 15, described below, may be implemented so as to be identical or similar to the above-described electronic device 100.

Figure 15:
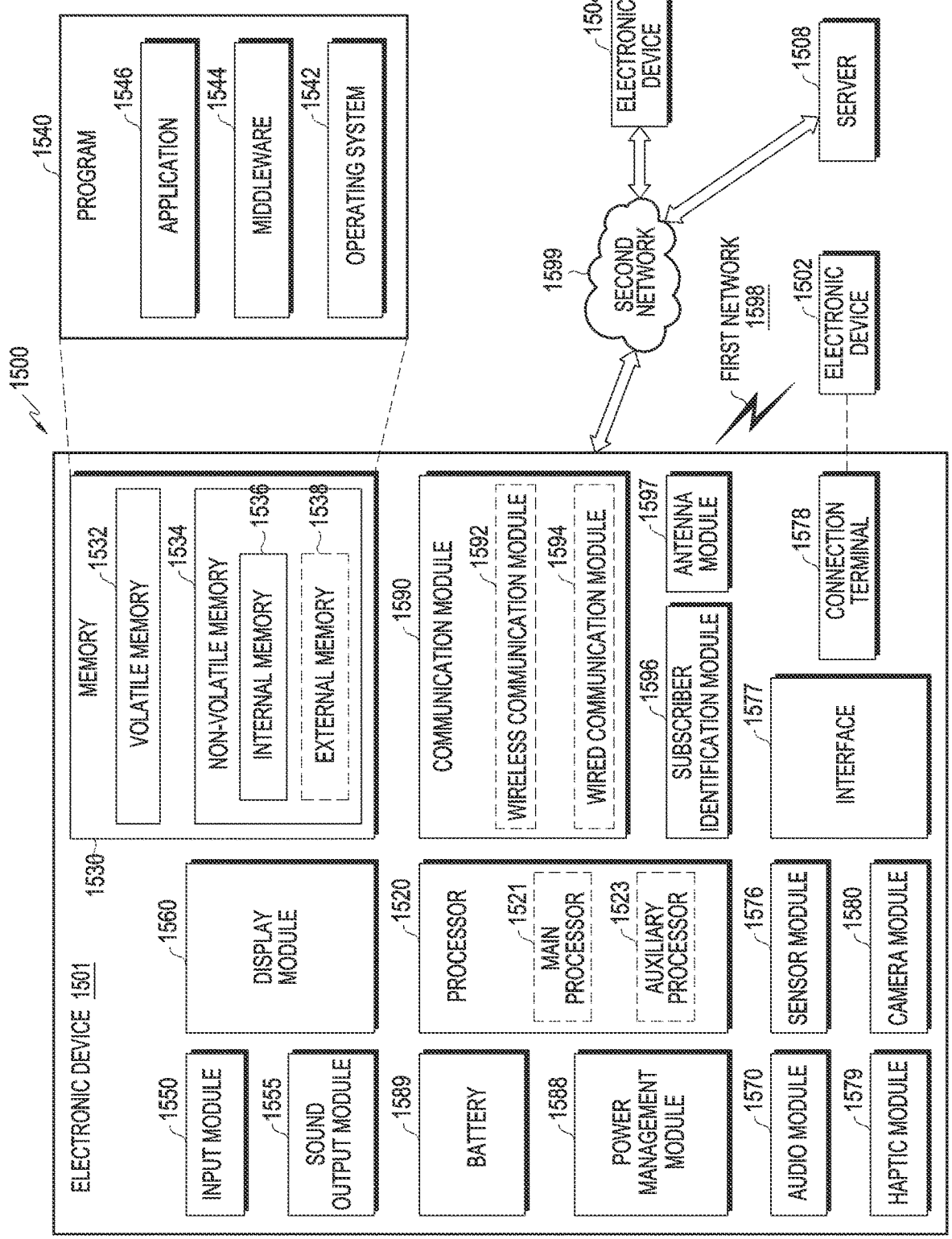
FIG. 15 is a block diagram of an electronic device in a network environment according to an embodiment of the disclosure.

FIG. 15 is a block diagram illustrating an electronic device in a network environment according to an embodiment of the disclosure.

Referring to FIG. 15, the electronic device 1501 in the network environment 1500 may communicate with an electronic device 1502 via a first network 1598 (e.g., a short-range wireless communication network), or an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input module 1550, a sound output module 1555, a display module 1560, an audio module 1570, a sensor module 1576, an interface 1577, a connecting terminal 1578, a haptic module 1579, a camera module 1580, a power management module 1588, a battery 1589, a communication module 1590, a subscriber identification module (SIM) 1596, or an antenna module 1597. In some embodiments, at least one of the components (e.g., the connecting terminal 1578) may be omitted from the electronic device 1501, or one or more other components may be added in the electronic device 1501. In some embodiments, some of the components (e.g., the sensor module 1576, the camera module 1580, or the antenna module 1597) may be implemented as a single component (e.g., the display module 1560).

The processor 1520 may execute, for example, software (e.g., a program 1540) to control at least one other component (e.g., a hardware or software component) of the electronic device 1501 coupled with the processor 1520, and may perform various data processing or computation. According to one embodiment, as at least part of the data processing or computation, the processor 1520 may store a command or data received from another component (e.g., the sensor module 1576 or the communication module 1590) in volatile memory 1532, process the command or the data stored in the volatile memory 1532, and store resulting data in non-volatile memory 1534. The non-volatile memory 1534 may include an internal memory 1536 and/or an external memory 1538. According to an embodiment, the processor 1520 may include a main processor 1521 (e.g., a central processing unit (CPU) or an application processor (AP)), or an auxiliary processor 1523 (e.g., a graphics processing unit (GPU), a neural processing unit (NPU), an image signal processor (ISP), a sensor hub processor, or a communication processor (CP)) that is operable independently from, or in conjunction with, the main processor 1521. For example, when the electronic device 1501 includes the main processor 1521 and the auxiliary processor 1523, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control, for example, at least some of functions or states related to at least one component (e.g., the display module 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active (e.g., executing an application) state. According to an embodiment, the auxiliary processor 1523 (e.g., an image signal processor or a communication processor) may be implemented as part of another component (e.g., the camera module 1580 or the communication module 1590) functionally related to the auxiliary processor 1523. According to an embodiment, the auxiliary processor 1523 (e.g., the neural processing unit) may include a hardware structure specified for artificial intelligence model processing. An artificial intelligence model may be generated by machine learning. Such learning may be performed, e.g., by the electronic device 1501 where the artificial intelligence is performed or via a separate server (e.g., the server 1508). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input module 1550 may receive a command or data to be used by another component (e.g., the processor 1520) of the electronic device 1501, from the outside (e.g., a user) of the electronic device 1501. The input module 1550 may include, for example, a microphone, a mouse, a keyboard, a key (e.g., a button), or a digital pen (e.g., a stylus pen).

The sound output module 1555 may output sound signals to the outside of the electronic device 1501. The sound output module 1555 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1560 may visually provide information to the outside (e.g., a user) of the electronic device 1501. The display module 1560 may include, for example, a display, a hologram device, or a projector and control circuitry to control a corresponding one of the display, hologram device, and projector. According to an embodiment, the display module 1560 may include a touch sensor adapted to detect a touch, or a pressure sensor adapted to measure the intensity of force incurred by the touch.

The audio module 1570 may convert a sound into an electrical signal and vice versa. According to an embodiment, the audio module 1570 may obtain the sound via the input module 1550, or output the sound via the sound output module 1555 or an external electronic device (e.g., an electronic device 1502 (e.g., a speaker or a headphone)) directly or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, an SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device 1504 via the first network 1598 (e.g., a short-range communication network, such as Bluetooth™ Wi-Fi direct, or infrared data association (IrDA)) or the second network 1599 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify or authenticate the electronic device 1501 in a communication network, such as the first network 1598 or the second network 1599, using subscriber information (e.g., international mobile subscriber identity (IMSI)) stored in the subscriber identification module 1596.

The wireless communication module 1592 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1592 may support a high-frequency band (e.g., the mmWave band) to achieve, e.g., a high data transmission rate. The wireless communication module 1592 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1592 may support various requirements specified in the electronic device 1501, an external electronic device (e.g., the electronic device 1504), or a network system (e.g., the second network 1599). According to an embodiment, the wireless communication module 1592 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1597 may transmit or receive a signal or power to or from the outside (e.g., the external electronic device) of the electronic device 1501. According to an embodiment, the antenna module 1597 may include an antenna including a radiating element composed of a conductive material or a conductive pattern formed in or on a substrate (e.g., a printed circuit board (PCB)). According to an embodiment, the antenna module 1597 may include a plurality of antennas (e.g., array antennas). In such a case, at least one antenna appropriate for a communication scheme used in the communication network, such as the first network 1598 or the second network 1599, may be selected, for example, by the communication module 1590 from the plurality of antennas. The signal or the power may then be transmitted or received between the communication module 1590 and the external electronic device via the selected at least one antenna. According to an embodiment, another component (e.g., a radio frequency integrated circuit (RFIC)) other than the radiating element may be additionally formed as part of the antenna module 1597.

According to various embodiments, the antenna module 1597 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 or 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, mobile edge computing (MEC), or client-server computing technology may be used, for example. The electronic device 1501 may provide ultra low-latency services using, e.g., distributed computing or mobile edge computing. In another embodiment, the external electronic device 1504 may include an internet-of-things (IoT) device. The server 1508 may be an intelligent server using machine learning and/or a neural network. According to an embodiment, the external electronic device 1504 or the server 1508 may be included in the second network 1599. The electronic device 1501 may be applied to intelligent services (e.g., smart home, smart city, smart car, or healthcare) based on 5G communication technology or IoT-related technology.

As described above, according to various embodiments disclosed herein, an electronic device (e.g., the electronic device 100 in FIGS. 1 to 3) may include: a first structure (e.g., the first structure 101 in FIGS. 1 to 3) including a first plate (e.g., the first plate 111*a* in FIG. 1 or 3) which provides a first surface (e.g., the first surface A1 in FIG. 3) and a second surface (e.g., the second surface F2 in FIG. 2 or 4A) facing a direction opposite to that of the first surface; a second structure (e.g., the second structure 102 in FIGS. 1 to 3) coupled to the first structure so as to surround at least a portion of the first structure and configured to guide sliding of the first structure in a direction parallel to the first surface or the second surface of the first structure; a flexible display (e.g., the flexible display 103 in FIGS. 1 to 3) which includes a first region (e.g., the first region A1 in FIG. 2) mounted on the first surface of the first structure and a second region (e.g., the second region A2 in FIG. 2) extending from the first region, the second region being at least partially received in the second structure at one side of the second structure or visually exposed out of the second structure by the sliding of the first structure; and at least one antenna structure (e.g., the antenna structure 161 in FIGS. 1 to 5A) disposed in at least one of the first structure or the second structure, wherein the antenna structure is at least partially positioned between the first region and the second region while the second region is received in the second structure.

According to various embodiments, the second structure may at least partially include a light-transmitting region (e.g., the auxiliary display region A3 in FIGS. 1 and 2), and at least a portion of the second region may be positioned to correspond to the auxiliary display region while the second region is received in the second structure.

According to various embodiments, the flexible display may be configured to output a screen by using the entirety or the portion of the second region positioned to correspond to the auxiliary display region.

According to various embodiments, the antenna structure may be mounted to the first structure, may be positioned to face the second structure while the second region is received in the second structure, and may be positioned so as not to at least partially face the second structure while the second region is visually exposed out of the second structure.

According to various embodiments, the antenna structure may be disposed in the second structure, and the second region may be positioned to face a direction opposite to that of the antenna structure while being visually exposed out of the second structure.

According to various embodiments, the antenna structure may be configured to perform at least one of near-field communication (NFC), wireless power transmission/reception, or magnetic secure transmission (MST).

According to various embodiments, the electronic device may further include a processor, wherein the processor is configured to perform a first function related to a first antenna included in the antenna structure and display information about the first function on the flexible display, based on the sliding of the first structure.

According to various embodiments, the processor may be configured to display an object related to the first function in a first region of the flexible display corresponding to the position of the first antenna, based on the sliding of the first structure.

According to various embodiments, the position of the object may be configured to be changed when the position of the first antenna is changed by the sliding of the first structure.

According to various embodiments, when the first antenna is a magnetic secure transmission antenna, the first function may be a payment function.

According to various embodiments, the processor may be configured to display an object regarding at least one credit card for performing the payment function, determine an input of selecting one object from among the displayed objects, and perform the payment function by using a credit card corresponding to the selected object when the first structure slides.

According to various embodiments, the processor may be configured to display guide information about the sliding.

According to various embodiments, when the first antenna is a wireless power transmission/reception antenna, the first function may be a wireless charging function.

According to various embodiments, the processor may be configured to display the guide information about the sliding in order to perform the wireless charging function.

According to various embodiments, the processor may be configured to, when the first structure slides, display guide information about a region to be brought into contact with an external electronic device in order to wirelessly transmit or receive power thereto or therefrom.

In an operation method of an electronic device according to various embodiments, the electronic device includes: a first structure including a first plate which provides a first surface and a second surface facing a direction opposite to that of the first surface; a second structure coupled to the first structure so as to surround at least a portion of the first structure and configured to guide sliding of the first structure in a direction parallel to the first surface or the second surface of the first structure; a flexible display which includes a first region mounted on the first surface of the first structure and a second region extending from the first region, the second region being at least partially received in the second structure at one side of the second structure or visually exposed out of the second structure by the sliding of the first structure; and at least one antenna structure disposed in at least one of the first structure or the second structure, wherein the antenna structure is at least partially positioned between the first region and the second region while the second region is received in the second structure, and the operation method may include performing a first function related to a first antenna included in the antenna structure, and displaying information about the first function on the flexible display, based on the sliding of the first structure.

According to various embodiments, the operation method of the electronic device may further include displaying an object related to the first function in a first region of the flexible display corresponding to the position of the first antenna, based on the sliding of the first structure.

According to various embodiments, the displaying of information about the first function may include displaying an object regarding at least one credit card in order to perform the payment function by using the first antenna, determining an input of selecting one object from among the displayed objects, and performing the payment function by using a credit card corresponding to the selected object when the first structure slides.

According to various embodiments, the operation method of the electronic device may further include displaying guide information about the sliding.

According to various embodiments, the displaying of the information about the first function may include displaying the guide information about the sliding such that a wireless charging function is performed using the first antenna, and displaying, when the first structure slides, guide information about a region to be brought into contact with an external electronic device for wireless charging.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a housing including a first structure and a second structure slidably connected to the first structure;
a flexible display disposed on the first structure and the second structure; an antenna structure disposed on the first structure or the second structure; and a processor configured to:
  perform a first function related to a first antenna included in the antenna structure,
  display information about the first function on the flexible display, based on a sliding of the first structure, and
  display an object related to the first function in a display region of the flexible display corresponding to a position of the first antenna, based on the sliding of the first structure,
wherein a state of the electronic device changes between an open state in which the first structure slides with respect to the second structure and a closed state in which the first structure does not slide with respect to the second structure,
wherein, when the electronic device is in the open state, the flexible display is located on a front side of an area where the antenna structure is located and the flexible display is not located on a back side of an area where the antenna structure is located, and
wherein, when the electronic device is in the close state, the flexible display is located on the front side and the back side of the area where the antenna structure is located.

2. The electronic device of claim 1, wherein the antenna structure is mounted to the first structure,
wherein the antenna structure is positioned to face the second structure when the electronic device is in the close state, and
wherein the antenna structure is positioned so as to at least partially not face the second structure when the electronic device is in the open state.

3. The electronic device of claim 1,
wherein the antenna structure is disposed in the second structure, and
wherein a display region of the flexible display is positioned to face a direction opposite to that of the antenna structure when the electronic device is in the open state.

4. The electronic device of claim 1, wherein the antenna structure is configured to perform at least one of near-field communication (NFC), wireless power transmission/reception, or magnetic secure transmission (MST).

5. The electronic device of claim 1, wherein a position of the information on the flexible display is configured to be changed when a relative position of the first antenna and the flexible display is changed by the sliding of the first structure.

6. The electronic device of claim 1, wherein the first function includes a payment function when the first antenna is a magnetic secure transmission (MST) antenna.

7. The electronic device of claim 6, wherein the processor is further configured to:
display objects on the flexible display regarding at least one credit card for performing the payment function;
determine an input of selecting an object from among the displayed objects; and
perform the payment function by using a credit card corresponding to the selected object when the first structure slides.

8. The electronic device of claim 1,
wherein the first function includes a wireless charging function when the first antenna is a wireless power transmission/reception antenna, and
wherein the processor is further configured to display guide information on the flexible display about the sliding in order to perform the wireless charging function.

9. The electronic device of claim 8, wherein the processor is further configured to display guide information on the flexible display about a region brought into contact with an external electronic device in order to wirelessly transmit or receive power when the first structure slides.

10. A method for operating an electronic device comprising a flexible display comprising a first region and a second region, the method comprising:
performing a first function related to a first antenna of an antenna structure included in the electronic device while the second region of the flexible display is received in a structure of the electronic device such that the second region is not visually exposed out of the structure;
displaying, on the first region of the flexible display, guide information to guide sliding of the flexible display while the second region of the flexible display is received in the structure of the electronic device such that the second region is not visually exposed out of the structure; and based on identifying the sliding of the flexible display to a specified position such that the second region slides out to the specified position with respect to the structure, displaying information related to the first function in a first area of the flexible display corresponding to a position of the first antenna.

11. The method of claim 10, wherein the displaying of the information related to the first function comprises:

displaying at least one object regarding at least one credit card in order to perform the first function via the first antenna;

determining an input of selecting an object from among the at least one object; and performing the first function by using a credit card corresponding to the selected object based on identifying that the flexible display slides.

12. The method of claim 10, wherein the first function includes a wireless charging function or a payment function.

13. The method of claim 10, wherein the displaying of the information related to the first function comprises:

displaying the guide information about the sliding to perform the first function via the first antenna; and displaying information about the area brought into contact with an external electronic device for wireless charging based on identifying that the flexible display slides.

* * * * *